United States Patent
Froy

(10) Patent No.: US 9,895,607 B2
(45) Date of Patent: Feb. 20, 2018

(54) HAPTIC FEEDBACK ON A GAMING TERMINAL DISPLAY

(71) Applicant: IGT Canada Solutions ULC, Moncton (CA)

(72) Inventor: David Froy, Lakeville (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 91 days.

(21) Appl. No.: 14/969,097

(22) Filed: Dec. 15, 2015

(65) Prior Publication Data

US 2017/0165566 A1    Jun. 15, 2017

(51) Int. Cl.
*A63F 9/24* (2006.01)
*A63F 13/285* (2014.01)
*G07F 17/32* (2006.01)

(52) U.S. Cl.
CPC ........ *A63F 13/285* (2014.09); *G07F 17/3209* (2013.01); *G07F 17/3211* (2013.01)

(58) Field of Classification Search
CPC . A63F 13/285; G07F 17/3211; G07F 17/3209
See application file for complete search history.

(56) References Cited

U.S. PATENT DOCUMENTS

| | | | |
|---|---|---|---|
| 9,639,158 B2* | 5/2017 | Levesque | G06F 3/016 |
| 2008/0064499 A1 | 3/2008 | Grant et al. | |
| 2011/0009195 A1* | 1/2011 | Porwal | A63F 13/22 |
| | | | 463/37 |
| 2011/0021272 A1* | 1/2011 | Grant | A63F 13/10 |
| | | | 463/30 |
| 2011/0140870 A1* | 6/2011 | Ullrich | A61B 34/76 |
| | | | 340/407.2 |
| 2012/0268412 A1 | 10/2012 | Cruz-Hernandez et al. | |
| 2014/0118127 A1* | 5/2014 | Levesque | G06F 3/016 |
| | | | 340/407.2 |
| 2014/0139448 A1 | 5/2014 | Levesque et al. | |
| 2014/0208204 A1* | 7/2014 | Lacroix | G06F 3/016 |
| | | | 715/702 |
| 2014/0267013 A1 | 9/2014 | Grant et al. | |
| 2014/0320435 A1* | 10/2014 | Modarres | G06F 3/0412 |
| | | | 345/173 |
| 2015/0022466 A1* | 1/2015 | Levesque | G06F 3/017 |
| | | | 345/173 |

(Continued)

OTHER PUBLICATIONS

International Search Report and Written Opinion Corresponding to International Application No. PCT/CA2015/051323; dated Aug. 11, 2016; 10 Pages.

*Primary Examiner* — Dmitry Suhol
*Assistant Examiner* — Carl V Larsen
(74) *Attorney, Agent, or Firm* — Sage Patent Group

(57) ABSTRACT

An electronic gaming machine (EGM) for providing haptic feedback to a player is provided. The EGM includes a touchscreen having a touchscreen surface and an ultrasonic actuator coupled to the touchscreen surface to vibrate the touchscreen surface. The EGM also includes a processor coupled to the touchscreen and the ultrasonic actuator. The processor is configured to identify a location of a player feature on the touchscreen surface and control the ultrasonic actuator based on at least one of the identified location and a game state associated with the game to provide a friction feedback effect to the player.

20 Claims, 14 Drawing Sheets

(56) References Cited

U.S. PATENT DOCUMENTS

2015/0145657 A1\* 5/2015 Levesque ............... G06F 3/016
340/407.2
2015/0185848 A1 7/2015 Levesque et al.
2017/0004819 A1\* 1/2017 Ochiai ................... G10K 15/00

\* cited by examiner

HAPTIC FEEDBACK ON A GAMING TERMINAL DISPLAY

TECHNICAL FIELD

The present disclosure relates generally to electronic gaming systems, such as casino gaming terminals. More specifically, the present disclosure relates to methods and systems for providing haptic feedback on touchscreen displays of electronic gaming systems.

BACKGROUND

Gaming systems, such as casino-based gaming terminals, often include a variety of physical input mechanisms which allow a player to provide instructions to the gaming terminal. For example, slot machines are often equipped with a lever or one or more buttons which cause the machine to initiate a spin of a plurality of reels.

Modern day gaming terminals are often electronic devices. The modern day gaming terminals may include a touchscreen display. The touchscreen display can provide a display interface to a player and can receive touchscreen input from the player. Further, modern day gaming terminals often include one or more speakers. While modern day gaming terminals can provide an immersive visual and audio experience, such gaming terminals typically only provide visual and audible feedback. There is a need for improved gaming terminals.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

There is described an electronic gaming machine (EGM) for providing a game to a player. The EGM includes a touchscreen having a touchscreen surface. The EGM also includes an ultrasonic actuator coupled to the touchscreen surface to vibrate the touchscreen surface. The EGM further includes a processor coupled to the touchscreen and the ultrasonic actuator. The processor is configured to identify a location of a player feature on the touchscreen surface. Further, the processor is configured to control the ultrasonic actuator based on at least one of the identified location and a game state associated with the game to provide a friction feedback effect to the player.

In another aspect, there is described a method for providing a game to a player at an electronic gaming machine. The electronic gaming machine includes a touchscreen having a touchscreen surface and an ultrasonic actuator coupled to the touchscreen surface to vibrate the touchscreen surface. The method includes identifying a location of a player feature on the touchscreen surface and controlling the ultrasonic actuator based on at least one of the identified location and a game state associated with the game to provide a friction feedback effect to the player.

In another aspect, there is described a non-transitory computer readable medium containing instructions which, when executed, cause a processor to identify a location of a player feature on a touchscreen surface and control an ultrasonic actuator based on at least one of the identified location and a game state associated with the game to provide a friction feedback effect to the player.

Other aspects and features of the present application will become apparent to those ordinarily skilled in the art upon review of the following description of specific embodiments of the application in conjunction with the accompanying figures.

Figure 1:
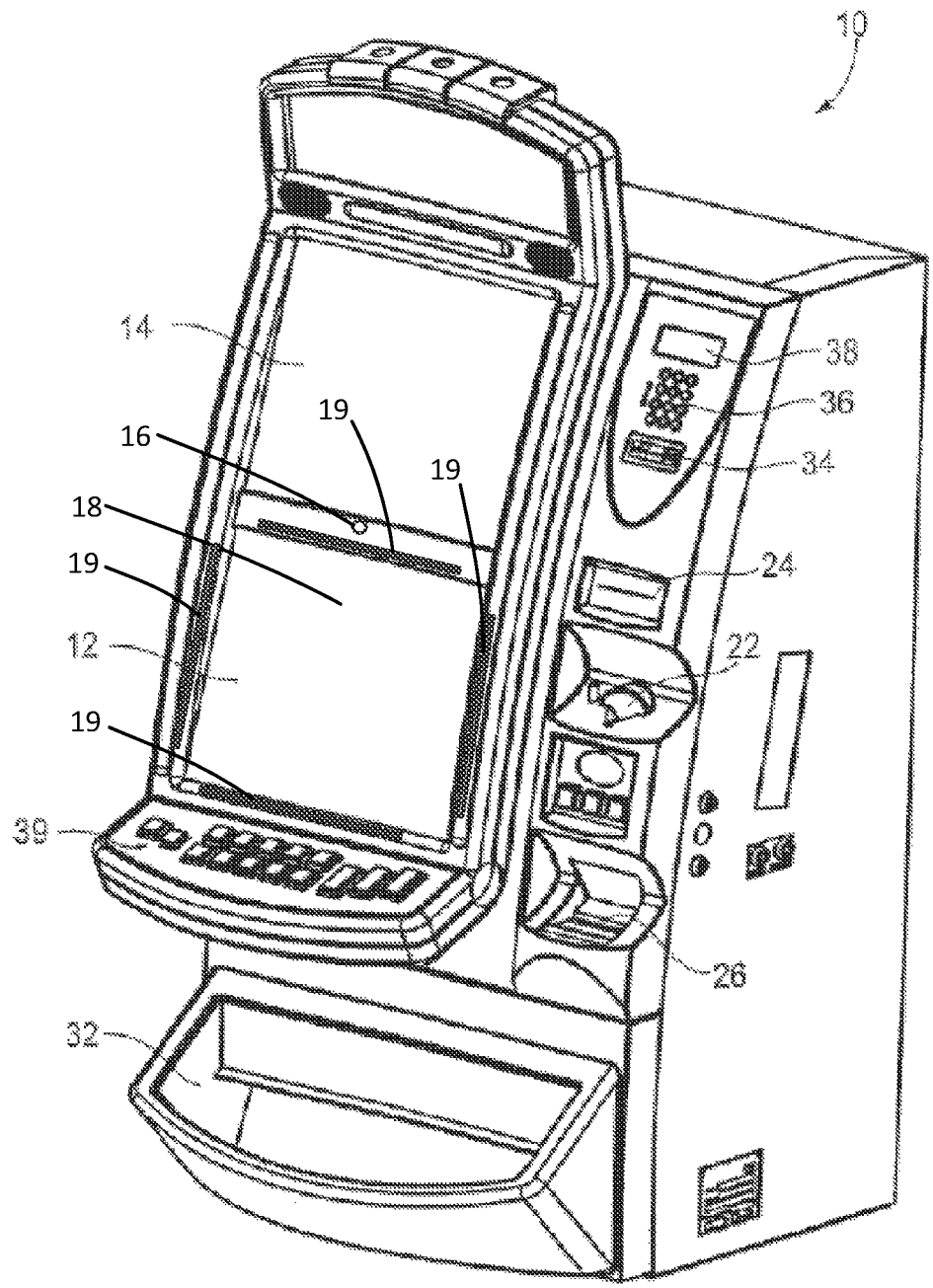
FIG. 1 illustrates an example electronic gaming machine (EGM) in accordance with example embodiments of the present disclosure.

The embodiments described herein may be included in any one of a number of possible gaming systems including, for example, a computer, a mobile device such as a smart phone or tablet computer, a casino-based gaming terminal, a virtual reality terminal or gaming devices of other types. In at least some embodiments, the gaming system may be connected to the Internet via a communication path such as a Local Area Network (LAN) and/or a Wide Area Network (WAN). In at least some embodiments, the gaming improvements described herein may be included in an Electronic Gaming Machine (EGM). An EGM 10 in accordance with example embodiments of the present disclosure is illustrated in FIG. 1. The techniques described herein may also be applied to other electronic devices that are not gaming systems.

Reference is now made to FIG. 1 which is an example electronic gaming machine (EGM). The EGM 10 is configured to provide haptic feedback to a user at a display 12. In some embodiments, the display 12 may be a touchscreen.

The touchscreen may have a touchscreen surface 18. As will be described, the haptic feedback may be provided by vibrating the touchscreen surface 18 to provide friction feedback effects on the touchscreen surface 18.

The display 12 may be of a variety of different display types including, for example, a thin film transistor (TFT) display, a liquid crystal display (LCD), a cathode ray tube (CRT), a light emitting diode (LED) display, an organic light emitting diode (OLED) display, or a display of another type.

As described, in some embodiments, the display 12 may be a touchscreen display. The touchscreen display may cause generation of electrical signals in response to receiving a touch input at a touchscreen surface 18. For example, the electrical signals may indicate coordinates of the touch input in terms of X and Y coordinates. The touchscreen display may determine where on the touchscreen surface 18 a player feature made contact.

A player or user of the EGM 10 may contact the display 12 using a player feature. A player feature, as described herein, may be a particular feature of the player such as, for example, a particular body part of the player. For example, the player feature may be a hand, a finger (such as an index finger), legs, feet, torso, arms, etc.

The display 12 may be configured to provide a visual representation of a game being executed on the EGM 10. In some embodiments, a front side of the display will generally be referred to as a touchscreen surface 18 and is the portion of the display 12 upon which displayed features of the game are rendered and displayed and which is generally viewable by the player. In some embodiments, the touchscreen surface 18 may be flat, as shown in FIG. 1. In some embodiments, the touchscreen surface 18 may be curved. In the example illustrated in FIG. 1, the display 12 has a display surface 18 that is substantially rectangular having four sides including a left side, a right side, a top side and a bottom side.

In some embodiments, the touchscreen display may have a touchscreen surface 18 for receiving touch input. In some embodiments, the touchscreen surface 18 may be integral with the display 12. That is, the touchscreen surface 18 may be an outer layer on the front side of the display 12. In some embodiments, the touchscreen surface 18 may be a touchscreen overlay. The touchscreen overlay may be touch-sensitive such that an electrical signal is produced in response to contact with the touchscreen overlay.

In some embodiments, the touchscreen surface 18 may be an added layer of glass, plastic, acrylic or any other suitable material. The layer of glass, plastic, acrylic or any other suitable material may be placed on the front side of the display 12 and may transmit touch input to the display 12. For example, the layer of glass, plastic or acrylic may transmit touch input to a touchscreen overlay associated with the display 12. In some embodiments, a rubber gasket may be provided between the layer of glass, plastic, acrylic or other suitable material and the display 12. The rubber gasket may be placed along the left side, the right side, the top side and/or the bottom side of the touchscreen surface 18.

As will be described in greater detail, in some embodiments, one or more ultrasonic actuators 19 may be coupled to the display 12. In particular, the one or more ultrasonic actuators 19 may be coupled to the touchscreen surface 18 of the display 12. The ultrasonic actuator 19 may be a device that vibrates the touchscreen surface 18. In some embodiments, the ultrasonic actuator 19 may emit ultrasonic waves causing vibrations at the touchscreen surface 18. The ultrasonic waves may be emitted at ultrasonic frequencies, including frequencies ranging from approximately 20 kilohertz (e.g., 20,000 hertz) up to several gigahertz. That is, ultrasounds may be sound waves with frequencies greater than the upper audible limit of hearing by a human being.

In some embodiments, when a player feature contacts the touchscreen surface 18, the ultrasonic actuator 19 may cause vibrations at the touchscreen surface 18 to provide a friction feedback effect detectable from the touchscreen surface 18 by a player feature. For example, when the ultrasonic actuator 19 causes the touchscreen surface 18 to vibrate at an ultrasonic frequency, the player feature may detect a friction effect from the touchscreen surface 18.

In some embodiments, when the ultrasonic actuator 19 causes the touchscreen surface 18 to vibrate at a higher frequency in the ultrasonic frequency range, the player feature may detect a friction feedback effect simulating a low coefficient of friction between the player feature and the touchscreen surface 18. For example, a friction feedback effect simulating a low coefficient of friction between the player feature and the touchscreen surface 18 may resemble a smooth or felt-like texture. A coefficient of friction may be a value which represents the ratio of the force of friction between two bodies.

Although examples in the present disclosure may reference a coefficient of friction between a player feature and a touchscreen surface 18, other measures describing a friction feedback effect detectable from a touchscreen surface 18 are possible. For example, a friction feedback effect may be described with reference to different levels of grits, similar to describing sandpaper with different levels of grits. Further, although examples in the present disclosure may describe one or more ultrasonic actuators 19 emitting waves or fields at frequencies in the ultrasonic frequency range, in some embodiments, the one or more ultrasonic actuators 19 may also emit waves or fields to cause vibrations at the touchscreen surface 18 using frequencies outside the ultrasonic frequency range. For example, the one or more ultrasonic actuators 19 may emit waves or fields at frequencies less than 20 kilohertz or greater than a few gigahertz.

In some embodiments, when the ultrasonic actuator 19 causes the touchscreen surface 18 to vibrate at a lower frequency in the ultrasonic frequency range, the player feature may detect a friction feedback effect simulating a high coefficient of friction between the player feature and the touchscreen surface 18. For example, a friction feedback effect simulating a high coefficient of friction between the player feature and the touchscreen surface 18 may resemble a gritty or a sandpaper-like surface. That is, the player feature may detect simulated resistance as the player feature is moved from one location to another location along the touchscreen surface 18.

In some embodiments, the EGM 10 may include a camera 16. In some embodiments, the camera 16 may be oriented in the direction of a player or a player feature of the EGM 10. In some embodiments, the camera 16 may be oriented in the direction of the display 12 and may capture information relating to real-time positioning of the player feature with respect to a touchscreen surface 18. The camera 16 may be a digital camera that has an image sensor that generates an electrical signal based on received light. The electrical signal may represent camera data. The camera data may be stored in memory of the EGM 10 in any suitable image or video file format.

In some embodiments, the camera 16 may be a stereo camera which includes two image sensors (i.e., the camera may include two digital cameras). The image sensors may allow multiple images to be obtained at the same time. In some embodiments, the cameras may generate stereoscopic images. The stereoscopic images may allow depth information to be obtained. Accordingly, the EGM 10 may be configured to determine a location of a player or player feature relative to components of the EGM 10 based on the camera data.

In the EGM 10 shown in FIG. 1, the camera 16 is mounted directly above the display 12 and midway between the left and right ends of the display 12. However, in some embodiments, the camera may be located at other locations.

The EGM 10 may include a video controller that controls the display 12. For example, the video controller may render images of games and provide the rendered images of the games to the display 12.

In some embodiments, the EGM 10 may include a second display 14. The second display 14 may provide additional game data or information to supplement information and images displayed on the display 12. In some embodiments, the second display 14 may provide static information, such as an advertisement for the game, the rules of the game, pay tables, pay lines or other information. In some embodiments, the second display 14 may perform similar functions as the display 12. For example, the second display may be coupled to one or more ultrasonic actuators to vibrate the second display surface. In some embodiments, the second display 14 may display portions of the main game or a bonus game alongside the display 12.

The second display 14 may utilize any of the display technologies described above (e.g., LED, OLED, CRT, etc.). In some embodiments, the second display 14 may be an auto stereoscopic display. In some embodiments, the second display 14 may include a secondary camera (which may be a stereo camera) for tracking the location of a user's eyes relative to the second display 14. In some embodiments, the second display 14 may not be an electronic display, and instead, it may be a display glass for conveying game information.

The EGM 10 may be equipped with one or more input mechanisms. As described, in some embodiments, one or both of the display 12 or the second display 14 may be a touchscreen display. The touchscreen display may include a touchscreen overlay. The touchscreen overlay may be touch-sensitive such that an electrical signal is produced in response to contact with the touchscreen overlay.

In some embodiments, the touchscreen may be a capacitive touchscreen device. The capacitive touchscreen device may include a transparent grid of conductors. When a player touches the capacitive touchscreen device, the touch may cause a capacitive change between at least two conductors, allowing the location of the touch on the touchscreen device to be determined. In some embodiments, the touchscreen device may be configured for multi-touch functionality.

Other input mechanisms may be provided instead of or in addition to the touchscreen. For example, a keypad 36 may accept player input. Player input may include a personal identification number (PIN) or any other player information. A display 38 above the keypad 36 may display a menu for providing instructions and other information. The display 38 may also provide visual feedback to the player relating to keys pressed on the keypad 36. In some embodiments, the keypad 36 may be an input device such as a touchscreen or a dynamic digital button.

The EGM 10 may also be equipped with control buttons 39. The control buttons 39 may be an input mechanism. The control buttons 39 may include buttons for receiving various commonly received inputs associated with a game provided by the EGM 10. In some embodiments, the control buttons 39 may include a bet button, a repeat bet button, a spin reels (or play) button, a maximum bet button, a cash-out button, a display pay lines button, a display payout tables button, select icon buttons or other buttons. In some embodiments, one or more of the control buttons may be virtual buttons or input interface elements provided by a touchscreen.

The EGM 10 may also include currency, credit or token handling mechanisms for receiving currency, credits or tokens required for game play or for dispensing currency, credits or tokens based on the outcome of the game play. A coin slot 22 may accept coins or tokens in one or more denominations to generate credits within EGM 10 for playing games. An input slot 24 may include an optical reader. The input slot 24 may receive machine readable printed tickets. An output slot 26 may include a printer. The output slot 26 may provide machine readable tickets. The input slot 24 and the output slot 26 may be used for cashless gaming.

A coin tray 32 may receive coins or tokens from a hopper upon a win or upon the player cashing out. In some embodiments, the EGM 10 may be a gaming terminal that does not pay in cash, but only issues a printed ticket which is not legal tender. In some embodiments, the printed ticket may be exchanged for legal tender elsewhere.

In some embodiments, a card reader interface 34, such as a card reader slot, may allow the EGM 10 to interact with a stored value card, identification card or a card of another type. A stored value card is a card which stores a balance of credits, currency or tokens associated with that card. An identification card is a card that identifies a user. In some embodiments, the functions of the stored value card and identification card may be provided on a common card. In some other embodiments, the above described functions may not be provided on the same card. For example, in some embodiments, an identification card may be used which allows the EGM 10 to identify an account associated with a user. The identification card uniquely identifies the user and may be used, for example, to track the amount of play associated with the user (e.g., in order to offer the user promotions when their play reaches certain levels). The identification card may be referred to as a player tracking card.

In some embodiments, an identification card may be inserted to allow the EGM 10 to access an account balance associated with the user's account. The account balance may be maintained at a host system or other remote server accessible to the EGM 10. The EGM 10 may adjust the account balance based on game play conducted on the EGM 10.

In some embodiments where a stored value card may be used, a balance may be stored on the card. The account balance may be adjusted to include additional credits when a winning outcome results from game play.

The stored value card and/or identification card may include a memory and a communication interface which allows the EGM 10 to access the memory of the stored value card. The card may take various forms including, for example, a smart card, a magnetic strip card (in which case the memory and the communication interface may both be provided by a magnetic strip), a card with a printed bar code or another type of card conveying machine readable information.

In some embodiments, the card may not be provided in the shape of a conventional card, but in another form factor. For example, the card may be a virtual card residing on a mobile device, such as a smartphone. The mobile device may, for example, be configured to communicate with the EGM 10 via a near field communication (NFC) subsystem.

The nature of the card reader interface 34 may depend on the nature of the cards used with the card reader interface 34. The card reader interface may, for example, be configured to read a magnetic code on the stored value card, interact with PINs associated with the card (e.g., if the card is a smart card), read a bar code or other visible indicia printed on the card (in which case the card reader interface 34 may be an optical reader), or interact with the card wirelessly (e.g., if it is NFC enabled). In some embodiments, the card may be inserted into the card reader interface 34 to trigger reading of the card. In some embodiments, when using NFC enabled cards, reading of the card may be performed without insertion of the card into the card reader interface 34.

While not illustrated in FIG. 1, the EGM 10 may include a chair or seat. In some embodiments, the chair or seat may be fixed to the EGM 10 so that the chair or seat does not move relative to the EGM 10. In some embodiments, the fixed connection may maintain a player in a position that is generally centrally aligned with the display 12.

The embodiments described herein are implemented by physical computer hardware embodiments. The embodiments described herein provide useful physical machines and particularly configured computer hardware arrangements of computer devices, servers, electronic gaming terminals, processors, memory, networks, for example. The embodiments described herein, for example, are directed to computer apparatuses, and methods implemented by computers through the processing of electronic data signals.

The embodiments described herein involve numerous hardware components such as computing devices, cameras, servers, receivers, transmitters, processors, memory, a display, networks and electronic gaming terminals. The components and combinations thereof may be configured to perform the various functions described herein, including providing haptic feedback to a user on a display screen. Accordingly, the embodiments described herein are directed towards electronic machines configured to process and transform electromagnetic signals representing various types of information. The embodiments described herein pervasively and integrally relate to machines and their uses. The embodiments described herein have no meaning or practical applicability outside their use with computer hardware, machines and various hardware components.

Substituting the EGM 10, computing devices, ultrasonic actuators, cameras, servers, receivers, transmitters, processors, memory, displays, networks and electronic gaming terminals for non-physical hardware, using mental steps for example, substantially affects the way the embodiments work.

At least some computer hardware features are essential elements of the embodiments described herein, and cannot be omitted or substituted for mental means without having a material effect on the operation and structure of the embodiments described herein. The computer hardware is essential to the embodiments described herein and is not merely used to perform steps expeditiously and in an efficient manner.

Figure 2:
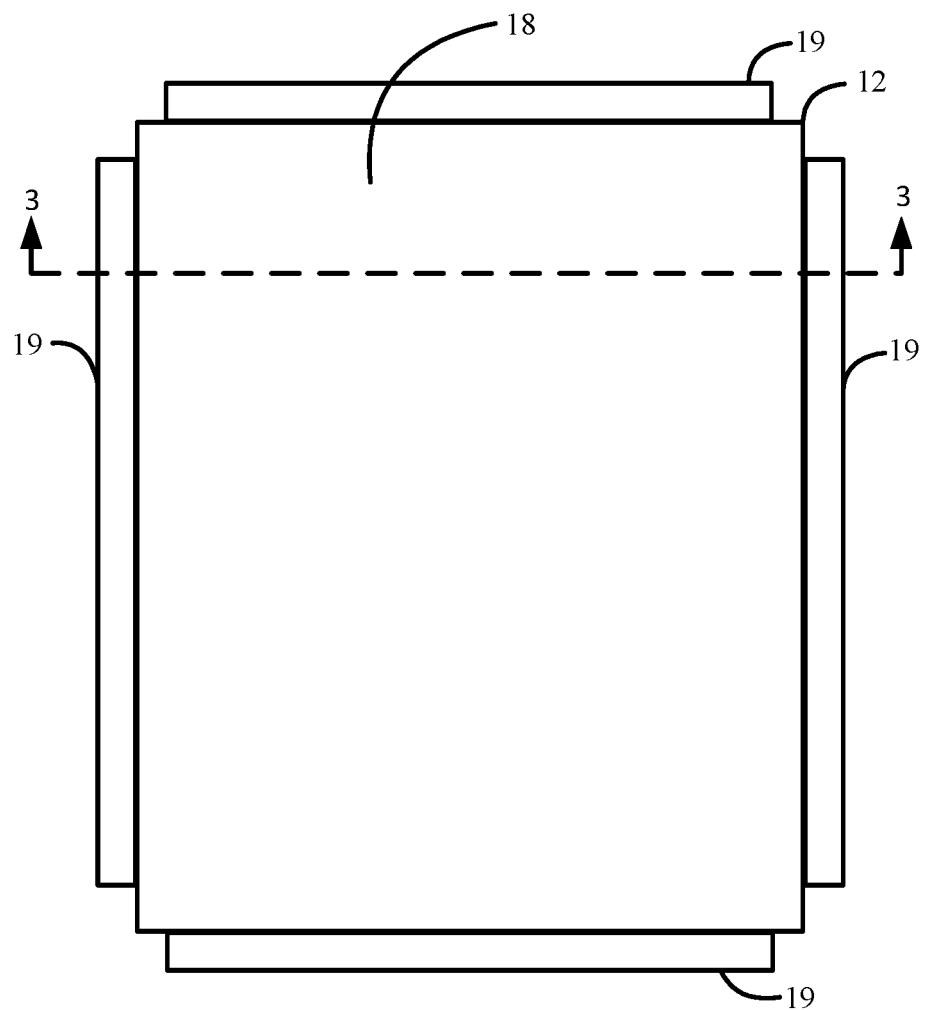
FIG. 2 illustrates a front view of an example display and example ultrasonic actuators in accordance with an embodiment of the present disclosure.

In the example of FIG. 1, the ultrasonic actuators 19 may be located at the sides of the touchscreen surface 18. To further illustrate the location and orientation of the ultrasonic actuators 19 in the example embodiment of FIG. 1, reference will now be made to FIG. 2. FIG. 2 illustrates a display 12 and ultrasonic actuators 19 shown in a front view and in isolation. Other components of the EGM 10 are not shown so that aspects of the display 12 and the ultrasonic actuators 19 may be more apparent.

In the example embodiment of FIG. 2, one or more ultrasonic actuators 19 may be located proximate a left side of the display 12, another one or more ultrasonic actuators 19 may be located proximate a right side of the display 12, another one or more ultrasonic actuators 19 may be located proximate a top side of the display and another one or more ultrasonic actuators 19 may be located proximate a bottom side of the display 12.

In the illustrated example of FIG. 2, four ultrasonic actuators 19 are provided. However, in other embodiments, the number of ultrasonic actuators 19 may be greater or less than four. For example, in some embodiments, one ultrasonic actuator 19 located at any of the left, right, top or bottom side of the display 12 may be sufficient to vibrate the touchscreen surface 18. In some embodiments, the ultrasonic actuator 19 may be an ultrasonic emitter, piezoelectric vibrator, a capacitive transducer or any other device that may be coupled to a touchscreen surface 18 and that may cause vibrations to the touchscreen surface 18.

In some embodiments, although two or more ultrasonic actuators 19 may be coupled to a touchscreen surface 18, one ultrasonic actuator 19 may be active and controlled to vibrate the touchscreen surface 18 at any given time.

In some embodiments, two or more ultrasonic actuators 19 forming a series of ultrasonic actuators 19 may concurrently operate to vibrate the touchscreen surface 18. That is, each ultrasonic actuator 19 in the series of ultrasonic actuators 19 may emit an ultrasonic field or wave such that the series of ultrasonic actuators 19 may collectively vibrate the touchscreen surface 18 to provide a friction feedback effect.

Figure 3A:
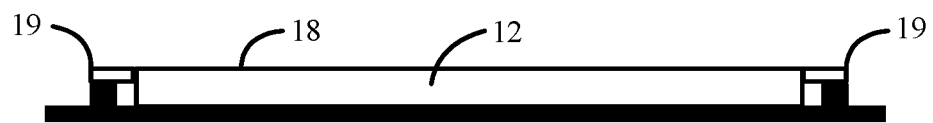
FIGS. 3A and 3B illustrate cross-sectional views of the example display and example ultrasonic actuators taken along line 3-3 of FIG. 2.

Reference is now made to FIG. 3A which illustrates a cross-sectional view of the display 12 and ultrasonic actuators 19 taken along the line 3-3 of FIG. 2 in accordance with an example embodiment. As illustrated in FIG. 3A, in some embodiments, the touchscreen surface 18 may be integral with the display 12. That is, the touchscreen surface 18 may be an outer layer on the front side of the display 12.

In some embodiments, one or more ultrasonic actuators 19 may be physically coupled to the touchscreen surface 18. That is, the ultrasonic actuators 19 may have a physical mechanism for vibrating the touchscreen surface 18. In some embodiments, one or more ultrasonic actuators 19 may not be physically coupled to the touchscreen surface 18. The ultrasonic actuators 19 may instead emit ultrasonic waves or fields that when coupled to the touchscreen surface 18 cause the touchscreen surface 18 to vibrate.

Figure 3B:
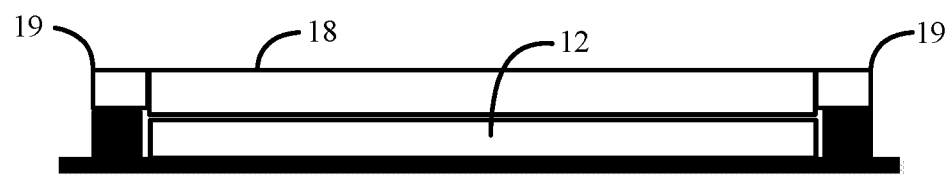

Reference is now made to FIG. 3B which illustrates a cross-sectional view of a display 12, a touchscreen surface 18 and ultrasonic actuators 19 taken along the line 3-3 of FIG. 2 in accordance with an example embodiment. As illustrated in FIG. 3B, the touchscreen surface 18 may be a layer of glass, plastic, acrylic or any other suitable material and may be placed on the front side of the display 12. The touchscreen surface 18 may transmit touch input to the display 12 or a touchscreen overlay associated with the display 12. In some embodiments, a gasket (not illustrated) may be provided between the layer of glass, plastic, acrylic or any other suitable material and the display 12. That is, the gasket may separate the touchscreen surface 18 from the display 12 such that when the processor 45 controls the ultrasonic actuator 19 to provide a friction feedback effect, the touchscreen surface 18 may vibrate while the display 12 may not vibrate. For example, the touchscreen surface 18 may vibrate to provide a friction feedback effect detectable by a player feature from the touchscreen surface 18. Further, the touchscreen surface 18 may also transmit touch input to the display 12.

The gasket may be placed along the left side, the right side, the top side and/or the bottom side of the touchscreen surface 18. The gasket may be made of rubber or any other material suitable to be placed between the touchscreen surface 18 material and the display 12. As illustrated in FIG. 3B, in some embodiments, the one or more ultrasonic actuators 19 may be coupled to the touchscreen surface 18 and not to the display 12. In some embodiments, the one or more ultrasonic actuators 19 may be coupled to both the display 12 and the touchscreen surface 18 but may vibrate the touchscreen surface 18 during operation.

Figure 4:
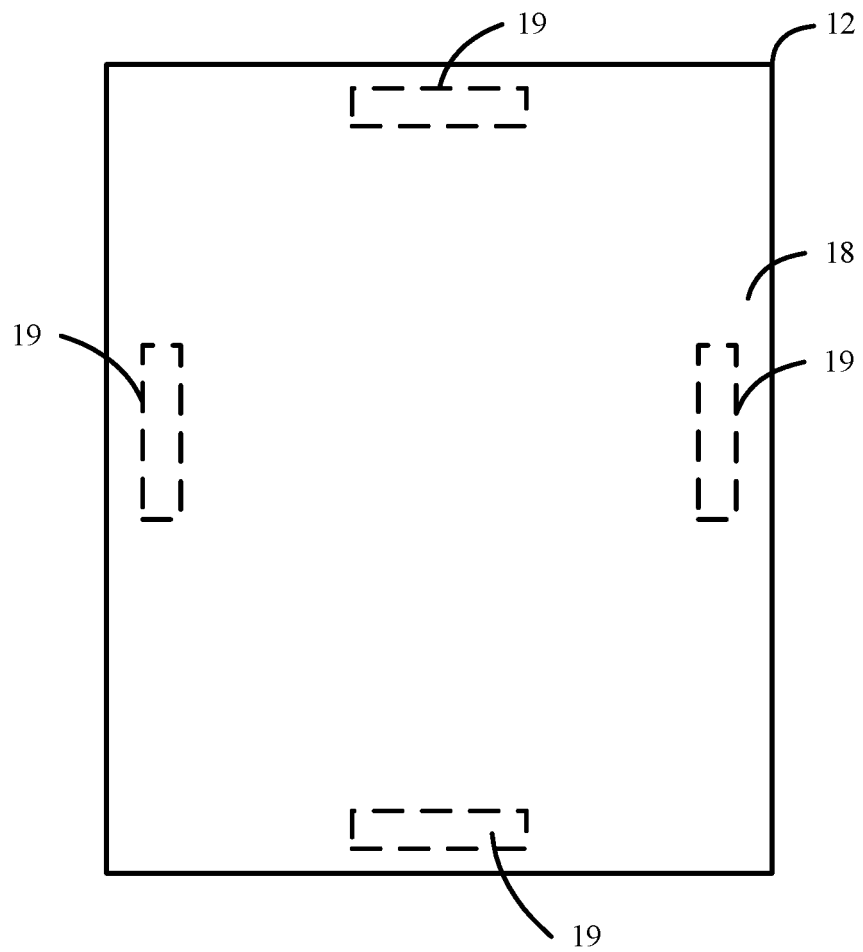
FIG. 4 illustrates a front view of an example display and example ultrasonic actuators in accordance with another embodiment of the present disclosure.

Reference is now made to FIG. 4 which illustrates a front view of an example display 12 and example ultrasonic actuators 19 in accordance with another embodiment of the present disclosure. The ultrasonic actuators 19 may be located under the display 12 such that the ultrasonic actuators 19 are coupled to a back side of the display 12. In some embodiments, the ultrasonic actuators 19 may emit ultrasonic waves or an ultrasonic field in the direction of the display 12. The ultrasonic waves or the ultrasonic field may permeate the display 12 prior to reaching the touchscreen surface 18 and cause vibration of the touchscreen surface 18. To minimize attenuation of the emitted ultrasonic waves or the ultrasonic field caused by the display 12, the display 12 may be a relatively thin display. The display 12 may permit the ultrasonic waves or the ultrasonic field to pass through the display to the touchscreen surface 18.

As illustrated in FIG. 4, in some embodiments, an ultrasonic actuator 19 may be located along each edge of the display 12. For example, an ultrasonic actuator 19 may be located along the left edge, the right edge, the top edge and the bottom edge and coupled to the back side of the display 12. However, other configurations are possible. In some embodiments, the ultrasonic actuators 19 may be located near each corner of the display 12 and coupled to the back side of the display 12.

Although four ultrasonic actuators 19 are illustrated in FIG. 4, in other embodiments, the number of ultrasonic actuators 19 may be greater or less than four. For example, in some embodiments, one ultrasonic actuator 19 may be located at any of the left, right, top or bottom side or any other location on the back side of the display 12 to vibrate the touchscreen surface 18.

Figure 5:
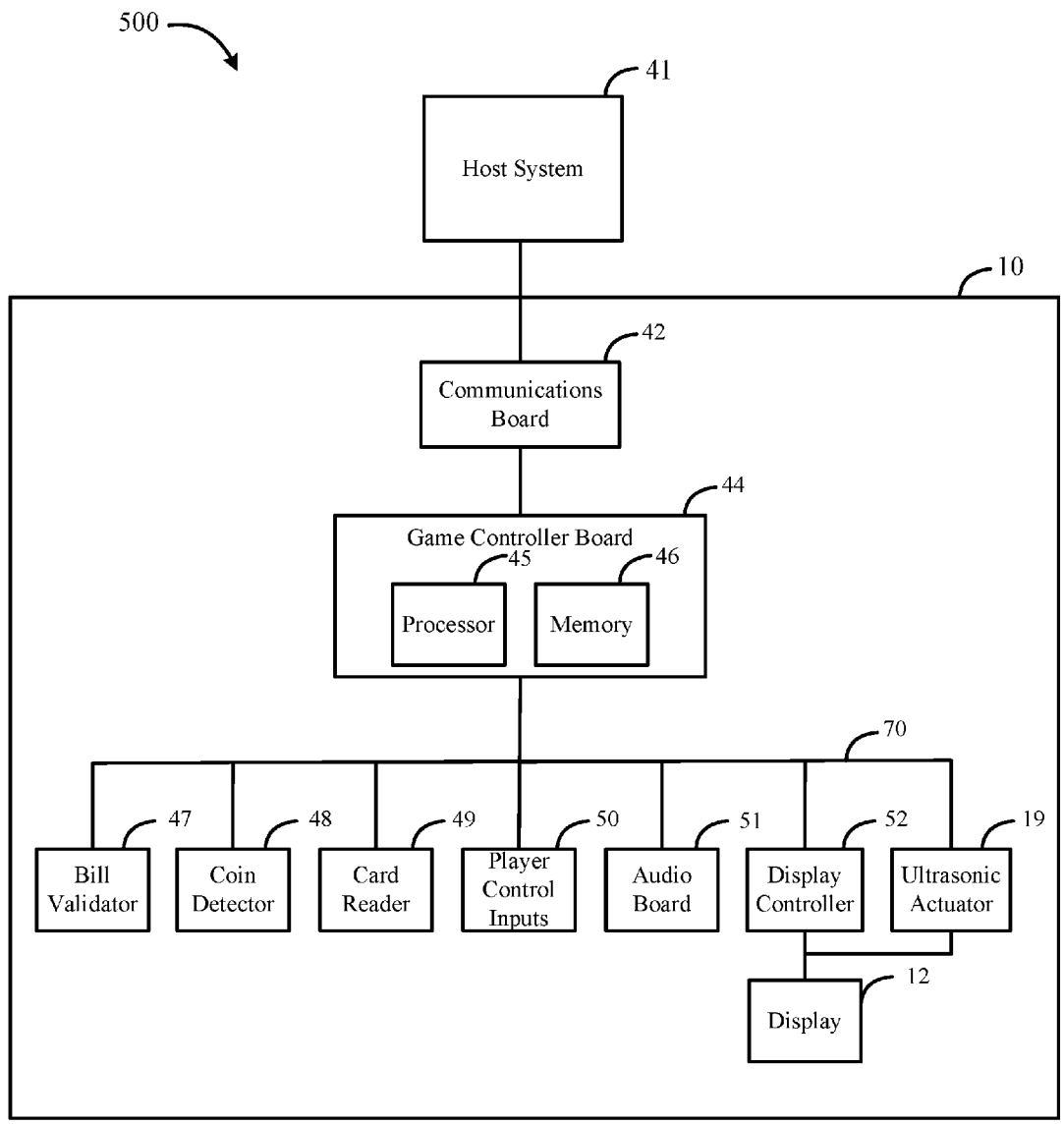
FIG. 5 illustrates a block diagram of an EGM and a host system in accordance with an example embodiment of the present disclosure.

Reference is now made to FIG. 5 which illustrates a block diagram 500 of an EGM 10 and a host system 41. The EGM 10 may be of the type described with reference to FIG. 1.

The EGM 10 may include a communications board 42. The communications board 42 may contain circuitry for communicably linking the EGM 10 to the host system 41 via a local area network (LAN) or another type of network using any suitable protocol, such as the Game-to-System (G2S) standard protocol. The communications board 42 may allow the EGM 10 to communicate with the host system 41 to enable software to be downloaded from the host system 41, to enable remote configuration of the EGM 10, to enable remote software verification and/or other features. The G2S protocol document is available from the Gaming Standards Association. The G2S protocol document is incorporated herein by reference.

In some embodiments, processors at the host system 41 may execute a game based on input received, via a network, from the EGM (or a computing device) and may provide output of the game execution, via a network, to the EGM (or a computing device). That is, the EGM may be a client device for presenting a game interface. In some embodiments, processors at the EGM (or a computing device) may execute the game. During execution, the EGM may transmit results of the game such that the host system 41 may update player points, credits or dollar accounts. In some embodiments, a combination of the processor(s) at the EGM (or a computing device) and the processor(s) at the host system 41 may execute the game.

The communications board 42 may transmit and receive data using a wireless transmitter, or it may be directly connected to a network running throughout the casino floor. The communications board 42 establishes a communication link with a master controller and buffers data between the network and a game controller board 44. The communications board 42 may also communicate with a network server, such as the host system 41, for exchanging information to carry out embodiments described herein.

The communications board 42 may be coupled to a game controller board 44. The game controller board 44 may contain a processor 45 and a memory 46. The processor 45 may carry out programs stored in the memory 46 and for providing the information requested by the host system 41 via the network. In some embodiments, the game controller board 44 may carry out game routines.

In the present disclosure, the term "a processor" is intended to include both a single processor and also a plurality of processors coupled to one another which distribute operations among the processors.

Peripheral devices/boards communicate with the game controller board 44 via a bus 70 using, for example, an RS-232 interface. Such peripherals may include a bill validator 47, a coin detector 48, a card reader interface 49 (e.g., a smart card reader or other type of card reader) and player control inputs 50 (e.g., buttons or a touchscreen). Other peripherals may include one or more cameras 16 (FIG. 1).

In some embodiments, the game controller board 44 may control one or more devices that produce the game output including audio and video output associated with a particular game that is presented to the user. For example, an audio board 51 may convert coded signals into analog signals for driving speakers. A display controller 52, typically requiring high data transfer rates, may convert coded signals to pixel signals for a display 12. As described above with reference to FIG. 1, the display 12 may have a touchscreen surface 18. The display controller 52 and the audio board 51 may be directly connected to parallel ports on the game controller board 44. The electronics on the various boards may be combined onto a single board.

In some embodiments, the EGM 10 may include a processor 45 coupled to a display 12 and to one or more ultrasonic actuators 19. The one or more ultrasonic actuators 19 may be coupled to the touchscreen surface 18. The ultrasonic actuators 19 may vibrate the touchscreen surface 18. In some embodiments, the ultrasonic actuator 19 may be an ultrasonic emitter, a piezoelectric vibrator, a capacitive transducer or any other device that may emit waves or cause vibrations at ultrasonic frequencies. Ultrasonic frequencies may be frequencies in the range of approximately 20 kilohertz (e.g., 20,000 hertz) to several gigahertz. That is, ultrasounds may be waves with frequencies higher than the upper audible limit of human hearing.

In some embodiments, the ultrasonic actuator 19 may be physically coupled to the touchscreen surface 18 to cause the touchscreen surface 18 to vibrate at a frequency in the range of ultrasound frequencies. In some embodiments, the one or more actuators 19 may emit an ultrasonic field having a standing wave. The emitted standing wave may be coupled to the touchscreen surface 18 and may cause the touchscreen surface 18 to vibrate. For example, the standing wave of the ultrasonic field may correspond to a friction feedback effect detected by a player feature from the touchscreen surface 18.

In some embodiments, when the ultrasonic actuator 19 causes the touchscreen surface 18 to vibrate at a frequency contained in the upper end of the range of ultrasonic frequencies, the player feature may detect a smooth feedback effect from the touchscreen surface 18. For example, the player feature may detect a felt-like or a glue-like texture on the touchscreen surface 18. That is, the ultrasonic actuator 19 may cause the touchscreen surface 18 to vibrate at such a rapid rate such that an effective time that the player feature physically contacts the touchscreen surface 18 may be less than when the ultrasonic actuator 19 may cause the touchscreen surface 18 to vibrate at a frequency contained in the lower end of the range of ultrasonic frequencies.

In some embodiments, when the ultrasonic actuator 19 causes the touchscreen surface 18 to vibrate at a frequency contained in the lower end of the range of ultrasonic frequencies, the player feature may detect a rough feedback effect or textured feedback effect from the touchscreen surface 18. For example, the player may seemingly detect a texture similar to a texture detected on sandpaper. That is, the ultrasonic actuator 19 may cause the touchscreen surface 18 to vibrate at a relatively lower rate such that an effective time that the player feature physically contacts the touchscreen surface 18 may be more than when the ultrasonic actuator 19 may cause the touchscreen surface 18 to vibrate at a frequency contained in the upper end of the range of ultrasonic frequencies.

In some embodiments, one or more of peripherals may include or be associated with an application programming interface (API). For example, in some embodiments, an API may be associated with the ultrasonic actuator 19. The API for the ultrasonic actuator 19 may be used to configure the ultrasonic actuator 19 for causing the touchscreen surface 18 to vibrate. That is, the ultrasonic actuator 19 may cause vibration to the touchscreen surface 18 for providing haptic feedback to a player feature. The haptic feedback may include providing a friction feedback effect from the touchscreen surface 18.

In some embodiments, the EGM 10 may include one or more processors provided, for example, in the game controller board 44, the display controller 52 and/or the one or more ultrasonic actuators 19. In some embodiments, a single "main processor", which may be provided in the game controller board 44, for example, may perform all of the processing functions described herein. In some embodiments, two or more processors may be provided to distribute processing.

The techniques described herein may also be used with other electronic devices, apart from the EGM 10. For example, in some embodiments, the techniques described herein may be used in a computing device 64.

Figure 6:
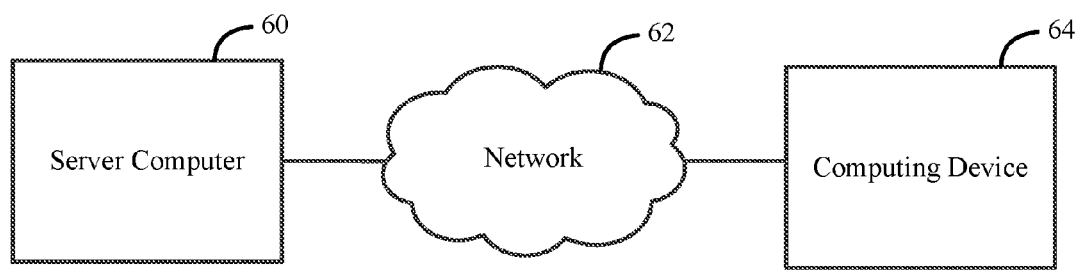
FIG. 6 is an example online implementation of a computer system configured for gaming.

Reference is now made to FIG. 6 which is an example online implementation of a computer system and an online gaming device. For example, a server computer 60 may be configured to enable online gaming in accordance with embodiments described herein. Accordingly, the server computer 60 and/or a computing device 64 may perform one or more functions of the EGM 10 described herein.

One or more users may use a computing device 64 that is configured to connect to the network 62 and, via the network 62. to the server computer 60 in order to access the functionality described in this disclosure. The computing device 64 may be configured with hardware and software to interact with an EGM 10 or server computer 60 via the network 62 to implement gaming functionality and provide haptic feedback, as described herein. For simplicity only one computing device 64 is illustrated but the system may include one or more computing devices 64 operable by users to access remote network resources. The computing device 64 may be implemented using one or more processors and one or more data storage devices configured with database(s) or file system(s), or using multiple devices or groups of storage devices distributed over a wide geographic area and connected via a network (which may be referred to as "cloud computing").

The computing device 64 may reside on any networked computing device, such as a personal computer, workstation, server, portable computer, mobile device, personal ditigal assistant, laptop, tablet, smart phone, wireless application protocol (WAP) phone, an interactive television, video display terminals, gaming consoles, electronic reading device and portable electronic devices or a combination of these.

The computing device 64 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The computing device 64 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The computing device 64 may include one or more input devices, such as a keyboard, mouse, camera, touch screen and a microphone, and may also include one or more output devices such as a display screen (with touchscreen capabilities) and a speaker. In some embodiments, the computing device 64 may have a touchscreen coupled to one or more ultrasonic actuators 19. The computing device 64 may have a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), signaling system 7 (SS7) signaling network, fixed line, local area network, wide area network, and others, including any combination of these. The computing device 64 is operable to register and authenticate users (using a login, unique identifier, and password for example) prior to providing access to applications, a local network, network resources, other networks and network security devices. The computing device 64 may serve one user or multiple users.

Figure 7:
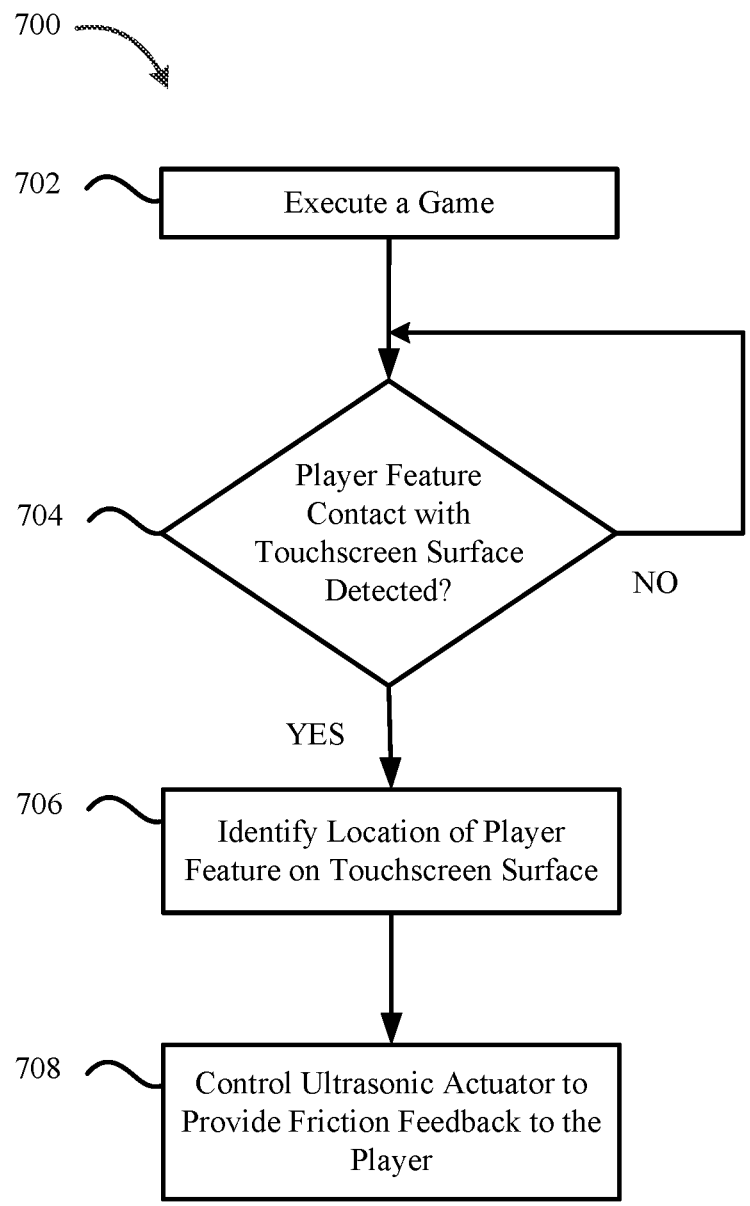
FIG. 7 is a flowchart illustrating an example method for providing haptic feedback on a touchscreen display of an EGM.

Reference is now made to FIG. 7 which illustrates an example method 700 for providing haptic feedback on an electronic gaming machine (EGM) 10. The method 700 may be performed by an EGM 10 of the type described above with reference to FIG. 1 or 5, by a host system 41 or server computer 60 described above with reference to FIGS. 5 to 6 or by a variation or combination of such electronic devices. For example, in at least some embodiments, processor-executable instructions may configure a processor 45 of a game controller board 44 to perform the method 700.

At 702, the processor 45 of the EGM 10 game controller board 44 may execute a game. In some embodiments, the game may provide a game interface. The game interface may include one or more input interface elements to elicit player input. Accordingly, in some embodiments, the game may require player input. For example, the game may be a slot machine type game and may require a player to specify a quantity of points or a quantity of currency that the player may like to bet. The processor 45 may provide the one or more input interface elements for display on the touchscreen surface 18 and the player may provide player input via the touchscreen surface 18 and/or player control inputs 50.

At 704, the processor 45 may determine whether a player feature has contacted the touchscreen surface 18. In some embodiments, player input may be necessary for the game execution to continue or for the game to advance to the next game operation. Accordingly, the player may provide input by using a player feature (e.g., a hand, a finger, etc.) to contact the touchscreen surface 18. In some embodiments, the player may contact the touchscreen surface 18 based on interface elements that are displayed and viewable from the touchscreen surface 18. If the processor 45 does not detect a player feature contacting the touchscreen surface 18, the processor 45 may continue to execute the game and/or may monitor the game execution to detect a player feature contacting the touchscreen surface 18.

If the processor 45 detects a player feature contacting the touchscreen surface 18, at 706, the processor 45 may identify a location of the player feature on the touchscreen surface 18. In some embodiments, in response to detecting touch input at the touchscreen surface 18, the processor 45 may receive one or more electrical signals from the touchscreen surface 18 that may indicate coordinates of the detected touch input in terms of X and Y coordinates. That is, the processor 45 may determine where on the touchscreen surface 18 the player feature made contact with the touchscreen surface 18.

In some embodiments, in addition to identifying the location of the player feature based on data from the touchscreen surface 18, the processor 45 may identify a location of the player feature using data from one or more cameras 16. For example, a camera 16 may be positioned to capture images of the player feature contacting the touchscreen surface 18 and the processor 45 may identify, based on the data from the one or more cameras 16, the location of the player feature on the touchscreen surface 18. That is, the data from the cameras 16 may be used to pre-empt or predict the location of the player feature contacting the touchscreen surface 18.

In some embodiments, in addition to being a touchscreen display, the display 12 may also be a hover-sensitive display that is configured to generate electrical signals when a player feature, such as a player finger or hand, is hovering adjacent the touchscreen surface 18 (e.g., when the player feature is within close proximity to the touchscreen surface 18 but not necessarily contacting the touchscreen surface 18). Similar to a touchscreen display, a hover-sensitive display may generate one or more electrical signals indicating the location of the player feature using X and Y coordinates. Accordingly, a hover-sensitive display may provide information to identify a location of a player feature on the touchscreen surface 18.

At 708, the processor 45 may control the ultrasonic actuator 19 based on at least one of the identified location and a game state associated with the game to provide friction feedback to the player. In some embodiments, based on the identified location where the player feature contacted the touchscreen surface 18, the ultrasonic actuator 19 may be coupled to the touchscreen surface 18 to vibrate the touchscreen surface 18. For example, in some embodiments, as will be described in greater detail, when the player feature contacts the touchscreen surface 18 at a particular location on the touchscreen surface 18, the ultrasonic actuator 19 may vibrate the touchscreen surface 18 to provide a particular friction feedback effect associated with the identified location. In some embodiments, the ultrasonic actuator 19 may be an ultrasonic emitter (e.g., for emitting ultrasonic frequency waves), a piezo electric vibrator, a capacitive transducer or any other device that may cause vibrations to the touchscreen surface 18 at ultrasonic frequencies.

By causing the touchscreen surface 18 to vibrate, the processor 45 may control the ultrasonic actuator 19 to simulate varying degrees of simulated surface friction on the touchscreen surface 18. By simulating surface friction on the touchscreen surface 18, the processor 45 may provide haptic feedback to the player feature from the touchscreen surface 18.

In some embodiments, the processor 45 may control the ultrasonic actuator 19 to vibrate the touchscreen surface 18 at various frequencies. For example, the processor 45 may control the ultrasonic actuator 19 to vibrate the touchscreen surface 18 at a frequency in the ultrasonic frequency range. The ultrasonic frequency range may include frequencies from approximately 20 kilohertz to several gigahertz. Although in the present example, the processor 45 may control the ultrasonic actuator 19 to cause vibrations in the ultrasonic frequency range, the processor 45 may control the ultrasonic actuator 19 to cause vibrations in any other frequency range for simulating varying degrees of surface friction on the touchscreen surface 18 as described herein.

In some embodiments, when the processor 45 controls the ultrasonic actuator 19 to vibrate at a higher frequency in the ultrasonic frequency range, the player feature may detect a friction feedback effect for simulating a low coefficient of friction between the player feature and the touchscreen surface 18. For example, the player feature may detect a smooth or felt-like texture on the touchscreen surface 18. That is, the player feature may be able to glide across at least a portion of the touchscreen surface 18 and may feel or perceive little resistance.

In some embodiments, when the processor 45 controls the ultrasonic actuator 19 to vibrate at a lower frequency in the ultrasonic frequency range, the player feature may detect a friction feedback effect for simulating a high coefficient of friction between the player feature and the touchscreen surface 18. For example, the player feature may detect a gritty or sandpaper-like texture on the touchscreen surface 18. That is, the player feature may feel or perceive surface resistance when attempting to glide across at least a portion of the touchscreen surface 18.

In some embodiments, the processor 45 may control the ultrasonic actuator 19 to emit an ultrasonic field having a standing wave. The standing wave may correspond to a friction feedback effect detected by the player feature from the touchscreen surface 18. For example, the ultrasonic actuator 19 may be coupled to the touchscreen surface 18. The processor 45 may control the ultrasonic actuator 19 to emit the ultrasonic field with a standing wave such that the touchscreen surface 18 may be continually vibrating at the frequency of the standing wave.

For example, a standing wave with a first frequency may be a frequency near the upper end of the ultrasonic frequency range. The standing wave may cause the touchscreen surface 18 to vibrate such that the touchscreen surface 18 may simulate a surface having a low coefficient of friction between the player feature and the touchscreen surface 18. For example, the touchscreen surface 18 may simulate a surface such as smooth glass. That is, because the processor 45 may control the ultrasonic actuator 19 to vibrate the touchscreen surface 18 with a standing wave at a selected frequency, the friction feedback effect may continue to be detected by a player feature on the touchscreen surface 18 for as long as the processor 45 controls the ultrasonic actuator to vibrate the touchscreen surface 18 with the standing wave at the selected frequency.

In some embodiments, the processor 45 may control the ultrasonic actuator 19 based on a game state. For example, the processor 45 may control the ultrasonic actuator 19 to provide a friction feedback effect associated with a game status update. For example, the processor 45 may control the ultrasonic actuator 19 to provide a friction feedback effect to simulate an increasingly rougher surface when the player successively advances game levels. In another example, the processor 45 may control the ultrasonic actuator 19 to provide a friction feedback effect to simulate a rough surface when the processor 45 determines that the player may be engaging in irresponsible gaming behaviour.

Example embodiments of controlling the ultrasonic actuator 19, for example at 708, will be discussed in greater detail at least with reference to FIGS. 8, 10 and 12.

Interface and Non-Interface Elements Distinguished

While at a casino or gaming establishment, a player may be engaged with an EGM 10 for long periods of time. A player may adapt to audio and visual indicators provided by the EGM 10. Accordingly, it may be desirable to provide the player with additional sources of feedback or additional types of indicators for conveying information relating to games. Further, the EGM 10 may provide a game interface with densely populated text and graphics. In some embodiments, a player may find it challenging to quickly discern what elements on a touchscreen surface 18 may be selectable (e.g., for interacting with the EGM 10) and which elements may not be selectable.

Figure 8:
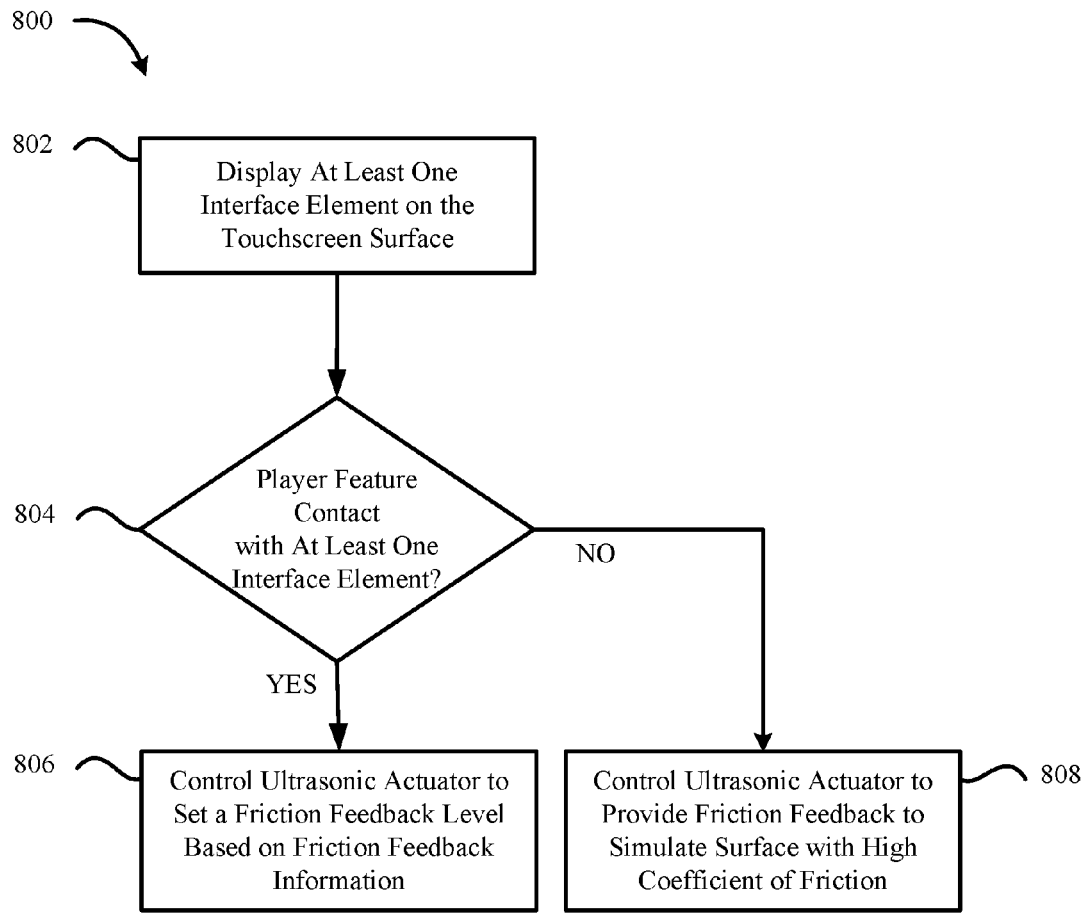
FIG. 8 is a flowchart illustrating an example method for providing haptic feedback on a touchscreen display of an EGM.

Reference is now made to FIG. 8 which illustrates an example method 800 for providing haptic feedback on an EGM 10. In particular, FIG. 8 illustrates an example method 800 for providing a friction feedback effect for interface elements and non-interface elements. The method may be performed by an EGM 10 of the type described above with reference to FIG. 1 or 5, by a host system 41 or server computer 60 described above with reference to FIGS. 5 to 6 or by a variation or combination of such electronic devices. For example, in at least some embodiments, processor-executable instructions may configure a processor 45 of a game controller board 44 to perform the method 800.

Figure 9:
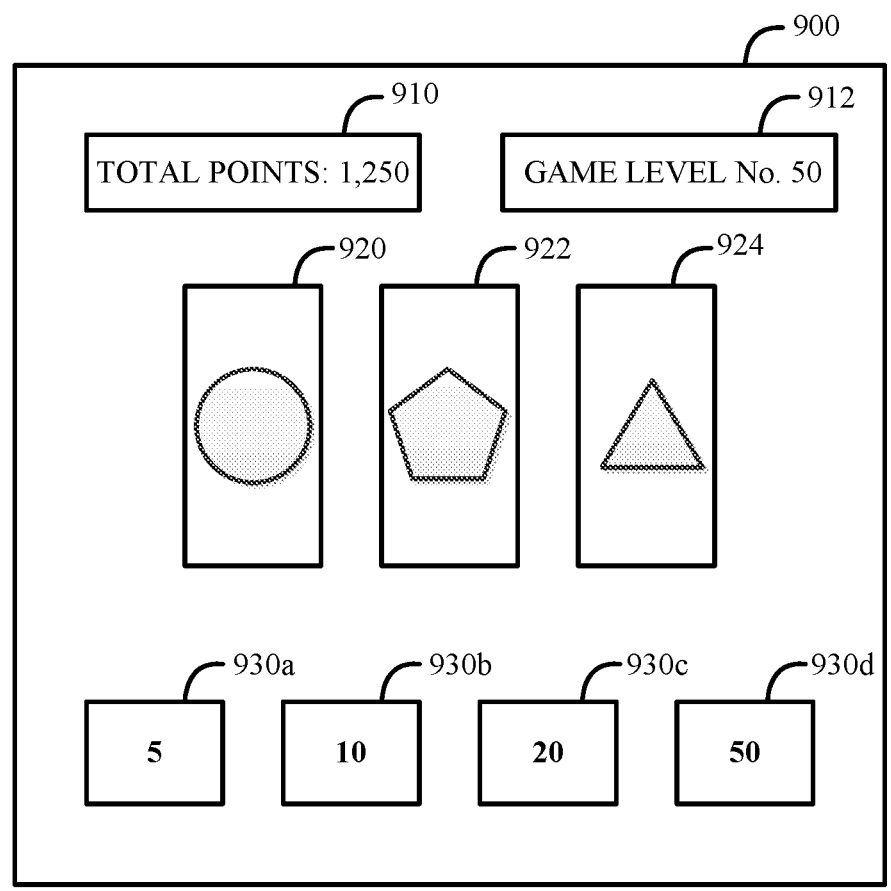
FIG. 9 illustrates an example game interface provided to a player of an EGM.

To illustrate the method 800, simultaneous reference will be made to FIG. 9 which illustrates an example game interface 900 provided on a display 12 of an EGM 10. The game interface 900 may include a "Total Points" indicator 910 for displaying the total number of accumulated points. The game interface 900 may also include a "Game Level" indicator 912 for displaying the current game level or game stage. In some embodiments, the game interface 900 may include a series of game play interfaces 920, 922, 924. For example, the game play interfaces 920, 922, 924 may be a series of virtual spinning reals of an electronic slot machine. Further, the game interface 900 may include a series of input interface elements 930a, 930b, 930c, 930d. For ease of explanation, the series of input interface elements 930a, 930b, 930c, 930d may generally be described as input interface elements 930.

In some embodiments, the display 12 may be a touchscreen display. The touchscreen may have a touchscreen surface 18. The input interface elements 930 may be viewable from the touchscreen surface 18 and a player may contact the touchscreen surface 18 for interacting with the input interface elements 930. For example, the game interface 900 may be an electronic slot machine and, using the input interface elements 930, the player may indicate an amount to bet for the game round. As illustrated, in an example, the player may place a bet having a value of 5, 10, 20 or 50 units. The units may, for example, be dollars, points or credits.

At 802, the processor 45 may display at least one interface element on a touchscreen surface 18. For example, the at least one interface element may include the example input interface elements 930 shown in the example game interface 900.

At 804, the processor 45 may determine whether the player feature has contacted the at least one interface element displayed on the touchscreen surface 18 based on the location of the player feature. As described, in some embodiments, based on data from one or more cameras 16, data from a hover-sensitive display and/or data from a touchscreen overlay, the processor 45 may determine the location of a player feature relative to the touchscreen surface 18. Further, the processor 45 may determine whether the location of the player feature on the touchscreen surface 18 is associated with the at least one interface element that is viewable from the touchscreen surface 18.

For example, referring again to FIG. 9, the processor 45 may determine that the player feature has contacted the touchscreen surface 18 at a location near the lower left portion of the touchscreen surface 18. Further, the processor 45 may determine that the location near the lower left portion of the touchscreen surface 18 corresponds to an input interface element 930a associated with a value of 5 units. Accordingly, the processor 45 may determine that the player feature has contacted an interface element, such as the input interface element 930a, associated with a value of 5 units.

In some embodiments, the at least one interface element may be associated with friction feedback information defining a friction feedback effect. For example, the processor 45 may control or configure an ultrasonic actuator 19 based on the friction feedback information. In some embodiments, the friction feedback information may include: a frequency parameter which controls the frequency at which the ultrasonic actuator 19 may be triggered; an amplitude parameter which controls the peak output of the ultrasonic actuator 19; an attack parameter which controls the amount of time taken for initial run up of the ultrasonic actuator output from nil (e.g., when the interface element is first activated) to peak; a decay parameter which controls the amount of time taken for the subsequent run down from the attack level to a designated sustain level; a sustain parameter which is an output level taken following the decay; and/or a release parameter which controls the time taken for the level to decay from the sustain level to nil.

In response to determining the player feature has contacted the interface element, at 806, the processor 45 may set a first friction feedback effect based on the friction feedback information associated with the interface element that is contacted by the player feature. For example, the processor 45 may control the ultrasonic actuator 19 to provide a standing wave with a frequency near the upper end of the ultrasonic frequency range. Accordingly, the ultrasonic actuator 19 may vibrate the touchscreen surface 18 at the frequency of the standing wave and the player may detect a smooth or felt-like texture on the touchscreen surface 18.

Referring again to FIG. 9, in some embodiments, the game interface 900 may include two or more interface elements, such as input interface elements 930. Each of the input interface elements 930 may be game-value interface elements. Each of the game-value interface elements may be associated with a game value. For example, the input interface elements 930*a*, 930*b*, 930*c*, 930*d* may be game-value interface elements. A first input interface element 930*a* may be associated with a game-value of 5 points, credits or dollars. A second input interface element 930*b* may be associated with a game-value of 10 points, credits or dollars. A third input interface element 930*c* may be associated with a game-value of 20 points, credits or dollars. Further, a fourth input interface element 940*d* may be associated with a game-value of 50 points, credits or dollars.

In some embodiments, each of the input interface elements 930 may be associated with friction feedback information defining a friction feedback effect. For example, the second input interface element 930*b* may be associated with second friction feedback information defining a second friction feedback effect and the second friction feedback effect may be different than the first feedback effect.

In some embodiments, each of the input interface elements 930 may be associated with a different set of friction feedback information, where each set of friction feedback information may be associated with a different friction feedback effect. For example, among the input interface elements 930, the fourth input interface element 930*d* may be associated with the fourth set of friction feedback information defining a fourth friction feedback effect that simulates a surface having a low coefficient of friction between the player feature and the touchscreen surface 18. The first input interface element 930*a* may be associated with the first set of friction feedback information defining a first friction feedback effect that simulates a surface having a high coefficient of friction between the player feature and the touchscreen surface 18. Further, the second input interface element 930*b* and the third input interface element 930*c* may be associated with the second friction feedback effect and the third friction feedback effect that simulates a surface having a coefficient of friction progressively in between the first friction feedback effect and the fourth friction feedback effect.

Accordingly, the input interface elements 930 may be associated with friction feedback information for defining a friction feedback effect associated with a game-value. That is, a game-value interface element associated with a higher game-value may be displayed by the display 12 (e.g., viewable from the touchscreen surface 18) and may be associated with a friction feedback effect simulating a smooth touchscreen surface (as detected by a player feature contacting the touchscreen surface 18). A game-value element associated with a lower game-value may be displayed by the display 12 (e.g., viewable from the touchscreen surface 18) and may be associated with a friction feedback effect simulating a rough or gritty touchscreen surface (as detected by a player feature contacting the touchscreen surface 18). Accordingly, the processor 45 may provide haptic feedback using friction feedback effects such that a player feature may quickly identify information relating to an input interface element 930 without needing to look at the touchscreen surface 18.

In another example, in response to determining the player feature has not contacted the at least one interface element, at 808, the processor 45 may control the ultrasonic actuator 19 to set a friction feedback effect to simulate a touchscreen surface having a very high coefficient of friction between the player feature and the touchscreen surface 18. That is, the processor 45 may set a friction feedback effect to simulate a touchscreen surface having a higher coefficient of friction between the player feature and the touchscreen surface than a coefficient of friction between the player feature and a touchscreen surface portion associated with at least one interface element. Accordingly, the processor 45 may provide haptic feedback using friction feedback effects such that a player feature may quickly identify whether the contacted portion of the touchscreen surface 18 is an interface element for providing information to the EGM 10.

Continuing with the example above, the first input interface element 930*a* may be associated with a friction feedback effect for simulating a surface having the highest coefficient of friction between the player feature and the touchscreen surface among the input interface elements 930 in the game interface 900. Accordingly, in response to determining the player feature has not contacted the at least one interface element, the player feature may detect a friction feedback effect for simulating a surface having a higher coefficient of friction between the player feature and the touchscreen surface than a coefficient of friction between the player feature and the touchscreen surface 18 portion associated with the first interface input interface element 930*a*. That is, when the player contacts a non-input interface element, the processor 45 may provide a friction feedback effect that feels more textured or gritty than the first input interface element 930.

Accordingly, the processor 45 may provide haptic feedback to the player feature by simulating a touchscreen surface having higher or lower coefficients of friction. By adjusting the frequency of a provided standing wave according to whether the player feature has contacted a touchscreen surface portion associated with an interface element, such as input interface elements 930, the processor 45 may be able to provide feedback to the player relating to whether the player feature may be contacting portions of the touchscreen surface 18 where input may be received.

Cumulative Friction Feedback Effect

While at a casino or gaming establishment, a player may be engaged with an EGM 10 for long periods of time. A player may adapt to audio and visual indicators provided by the EGM 10. Accordingly, it may be desirable to provide the player with additional sources of feedback or additional types of indicators for conveying information relating to games. For example, it may be desirable to provide indications relating to the progressive nature of the game being played or indications of progressive merit, such as advancement of game levels or accumulation of points or credits.

Figure 10:
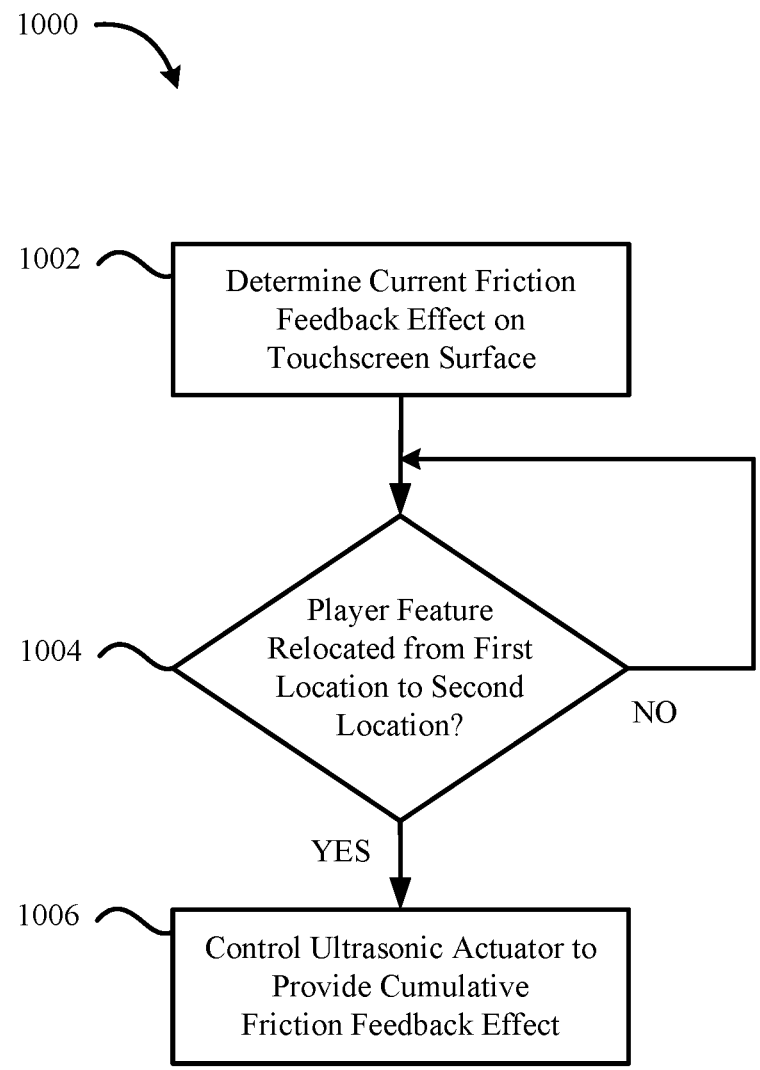
FIG. 10 is a flowchart illustrating an example method for providing a cumulative friction feedback effect on a touchscreen display of an EGM.

Reference is now made to FIG. 10 which illustrates an example method 1000 for providing haptic feedback on an EGM 10. In particular, FIG. 10 illustrates an example method 1000 for providing a cumulative friction feedback effect in response to user input. The method may be performed by an EGM 10 of the type described above with reference to FIG. 1 or 5, by a host system 41 or server computer 60 described above with reference to FIGS. 5 to 6 or a variation or combination of such electronic devices. For example, in at least some embodiments, processor-executable instructions may configure a processor 45 of a game controller board 44 to perform the method 1000.

To illustrate the method 1000, simultaneous reference will be made to FIG. 1100 which illustrates an example game interface 1100 provided on a display 12 of an EGM. The example game interface 1100 may include a "Total Points"

indicator 1110 for displaying the total number of accumulated points. The game interface 1100 may also include an "Elapsed Time" indicator 1112 for displaying, for example, the total amount of time that has passed since the start of the game round. In some embodiments, the game interface 1100 may include a game play interface 1114, a movable status bar 1116 and a sliding input interface element 1118.

With the game associated with the game interface 1100, the player may be required to accumulate a pre-determined number of game credits within a specified amount of time. For example, the player may be required to accumulate 5,000 game credits within 90 seconds. Further, the player may accumulate game credits by continually sliding a player feature across a sliding input interface element 1118. As the player accumulates game credits, the movable status bar 1116 may move towards a star shape. When the movable status bar 1116 reaches the star shape of the game play interface 1114, the player will have accumulated the required number of game credits.

Continuing with the present example, as the player feature continually slides across the input interface element 1118 to "pump up an object" and to accumulate game credits, the processor 45 may control an ultrasonic actuator 19 to provide haptic feedback to the player feature.

At 1002, the processor 45 may determine a current friction feedback effect on the touchscreen surface 18. For example, the processor 45 may control the ultrasonic actuator 19 to provide a friction feedback effect to the player feature to simulate a touchscreen surface having a low coefficient of friction between the player feature and the touchscreen surface 18. That is, the processor 45 may provide an initial friction feedback effect to the touchscreen surface 18 and the processor 45 may determine, for example, friction feedback information associated with the initial friction feedback effect.

Figure 11:
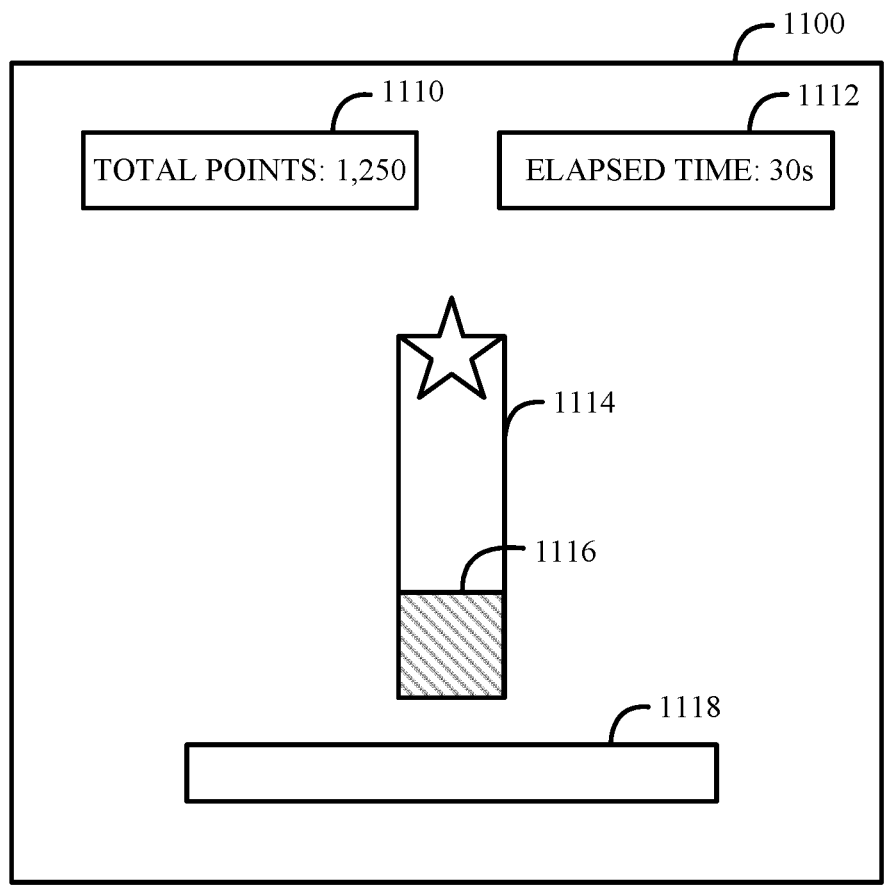
FIG. 11 illustrates an example game interface provided to a player of an EGM.

At 1004, the processor 45 may determine whether the player feature has relocated from a first location to a second location. In some embodiments, the processor 45 may determine that the player feature has relocated from a first location to a second location when the player feature slides across a portion of the touchscreen surface. For example, the game illustrated in FIG. 11 may require the player feature to move laterally across the sliding input interface element 1118 as quickly as possible to accumulate game-credits within a fixed amount of time (e.g., 60 seconds). In some embodiments, the processor 45 may determine that the player feature has relocated from a first location to a second location when the player successively taps the player feature on the touchscreen surface 18. For example, tapping the player feature on the touchscreen surface 18 may simulate actuating a mechanical valve for pumping fluids from one location to another location (e.g., "pumping an object").

In response to determining the player feature has relocated from a first location to a second location, at 1006, the processor 45 may control the ultrasonic actuator 19 to provide a cumulative friction feedback effect. For example, for each time that the player feature slides across the input interface element 1118 from a first location to a second location, the processor 45 may control the ultrasonic actuator 19 to provide a friction feedback effect simulating a surface with a relatively higher coefficient of friction between the player feature and the touchscreen surface 18. The relatively higher coefficient of friction between the player feature and the touchscreen surface 18 may be associated with the increasing number of game-credits being accumulated. Further, the processor 45 may update the game play interface 1114 such that the rising status bar 1116 gets closer to the star shape at the top of the game play interface.

Accordingly, the processor 45 may control the ultrasonic actuator 19 to provide a cumulative friction feedback effect for indicating a progressive game status. For example, in the game provided in the game interface 1100, a cumulative friction feedback effect, including a progressively rougher surface texture, may provide indication to the player feature that the player is approaching the required number of game-credits to win a game round. That is, a cumulative feedback effect may provide a player feature a relative indication of progressive aspect of a game.

Guiding a Player Feature to a Touchscreen Target Interface Element

An EGM 10 may execute a game requiring a player to locate a target interface element. The EGM 10 may provide audio and visual feedback for assisting the player in locating the target interface element. However, an electronic gaming machine may be located in a casino and located alongside several other gaming machines. The casino environment may be very noisy and audio feedback played through speakers may not be audible to the player. Further, the player may be distracted by visual indicators from other gaming machines. Accordingly, it may be useful to provide an additional level of feedback to the player for enhancing the player's gaming experience.

Figure 12:
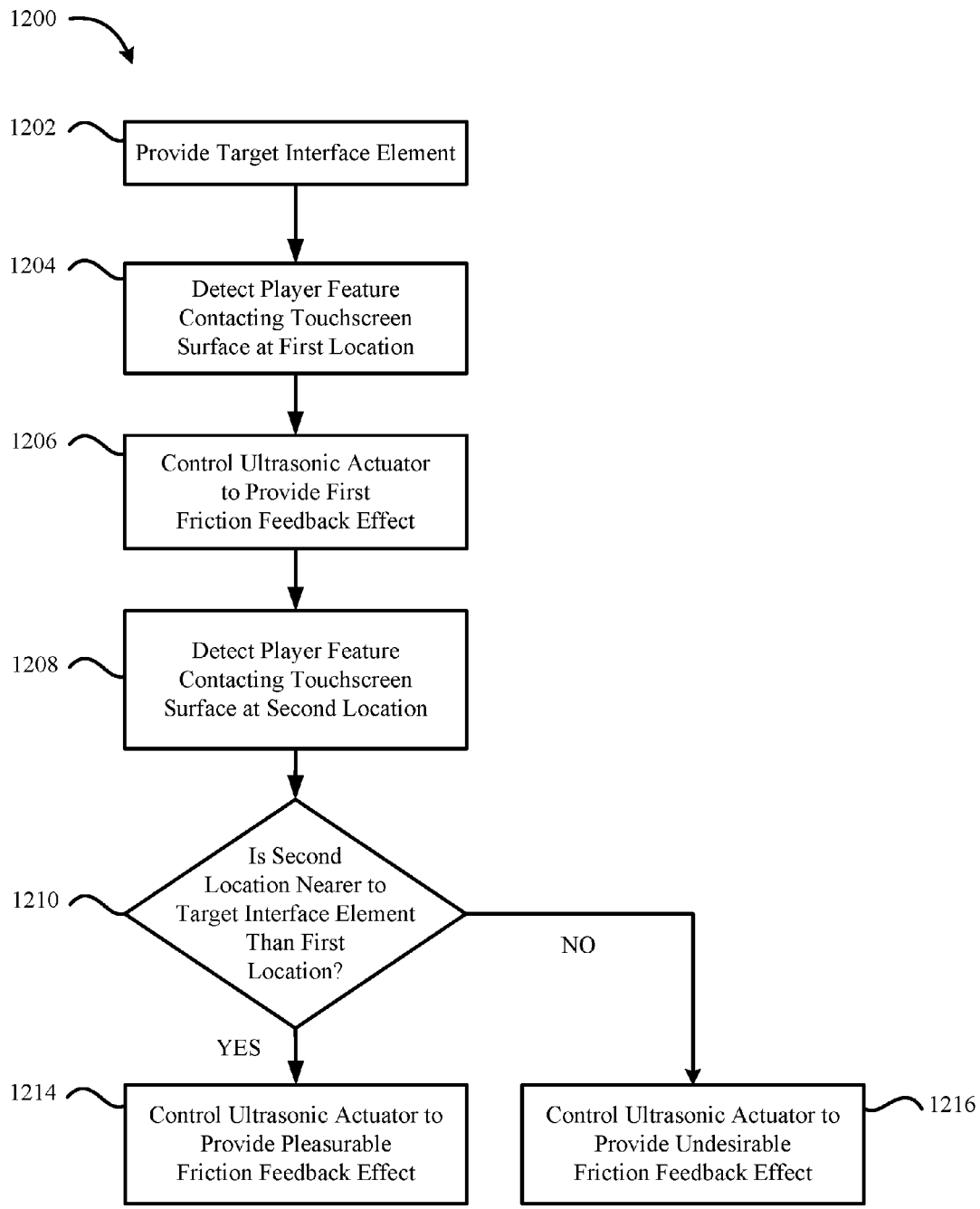
FIG. 12 is a flowchart illustrating an example method for providing haptic feedback to guide a player feature towards a target interface element.

Reference will now be made to FIG. 12 which illustrates an example method 1200 for providing haptic feedback to guide a player feature towards a target interface element. The method 1200 may be performed by the EGM 10 of the type described above with reference to FIG. 1 or 5, by a host system 41 or server computer 60 described above with reference to FIGS. 5 to 6 or by a variation or combination of such electronic devices. For example, in at least some embodiments, processor-executable instructions may configure a processor 45 of a game controller board 44 to perform the method 1200.

To illustrate the method 1200, simultaneous reference will be made to FIGS. 13A, 13B, 13C which illustrate an example game interface 1300 provided on a display 12. In some embodiments, the game interface 1300 may be provided on a touchscreen display having a touchscreen surface 18. The game interface 1300 may include a target interface element 1302 and several game objects 1304 distinct from the target interface element 1302. Although one target interface element 1302 and three game objects 1304 are illustrated, any number of target interface elements 1302 and any number of game objects 1304 may be provided on the game interface 1300. Further, although the target interface element 1302 is generally illustrated as a rectangular object, the target interface element 1302 may be any shape. Similarly, although the game objects 1304 are generally illustrated as circular objects, the game objects 1304 may be any shape and may be the same shape as the target interface element 1302. The game interface 1300 may include other objects, including other graphics or text. However, for ease of explanation, selected objects are illustrated in the game interface 1300.

In some embodiments, the game may require that a player contact a touchscreen surface 18 to identify a target interface element 1302. The player may interact with the game interface 1300 using a player feature, such as an outstretched finger at a first location 1310 (FIG. 13A), second location 1312*a* (FIG. 13B), or third location 1312*b* (FIG. 13C).

In some embodiments, the target interface element 1302 may be a "Call Attendant" button. For example, the method 1200 may assist a player with visual impairment in locating the target interface element 1302, such as the "Call Attendant". That is, as will become apparent, by receiving haptic feedback based on a detected friction feedback effect from the touchscreen surface 18, a player with visual impairment may be guided to the "Call Attendant" button.

In some embodiments, the target interface element 1302 may be a game object, such as a bonus prize. For example, the game may require that the player locate a target interface element 1302 in a game interface 1300 filled with other objects, where the other objects may be nominal prize elements. In some embodiments, the target interface element 1302 may be hidden. That is, the target interface element 1302 may be camouflaged and not easily distinguished from other game objects 1304. For example, the target interface element 1302 may be a circular object and difficult to distinguish from the other game objects 1304. Accordingly, the game may require that the player locate the target interface element 1302 by contacting the touchscreen surface 18 using an outstretched finger at a first location 1310, second location 1312*a*, or third location 1312*b*.

In some embodiments, the target interface element 1302 may not be displayed by the display 12 or may not be visible from the touchscreen surface 18. That is, the processor 45 may not render or make visible to the player the target interface element 1302. For example, the game may require that the player use the provided haptic feedback to locate the target interface element 1302.

Referring again to FIG. 12, at 1202, the processor 45 may provide the target interface element 1302. In some embodiments, the target interface element 1302 may be provided to the display 12 and may be visible from the touchscreen surface 18. In some other embodiments, the target interface element 1302 may not be displayed by the display 12 or may not be visible from the touchscreen surface 18. That is, the target interface element 1302 may be defined but may not be rendered on the display 12 or viewable from the touchscreen surface 18.

At 1204, the processor 45 may detect a player feature contacting the touchscreen surface 18 at a first location 1310. For example, referring again to FIG. 13A, the processor 45 may detect an outstretched player finger at the first location 1310. Although the player feature is described as an outstretched player finger, the player feature may be any other feature of the player, including, for example the bottom of a player's palm. In some embodiments, the player feature may be a pen device that is held by the player and designed for contacting and interfacing with the touchscreen surface 18.

At 1206, the processor 45 may control the ultrasonic actuator 19 to provide a first friction feedback effect on the touchscreen surface 18. For example, the processor 45 may control the ultrasonic actuator 19 such that the player feature may detect a friction feedback effect, such as a texture, on the touchscreen surface 18. That is, the player feature may detect a friction feedback effect simulating a high coefficient of friction between the player feature and the touchscreen surface to provide simulated resistance to the player feature. Although the friction feedback effect is described with respect to relative coefficients of friction, any other measure describing the ratio of friction forces between two bodies may be used to describe the friction feedback effect detected by the player feature. As will be apparent, the first friction feedback effect may be an initial reference point such that the player feature may determine, based on a second friction feedback effect, whether the player feature may be moving nearer or away from the target interface element 1302. As will be described, in some embodiments, the second friction feedback effect may be a pleasurable friction feedback effect or an undesirable friction feedback effect.

At 1208, the processor 45 may detect the player feature contacting the touchscreen surface at a second location 1312*a*. For example, referring to FIG. 13B, the processor 45 may detect the outstretched player finger at the second location 1312*a*.

At 1210, the processor 45 may determine whether the second location is nearer to the target interface element than the first location. In some embodiments, the processor 45 may determine whether the second location 1312*a* is nearer to the target interface element 1302 than the first location 1310 by calculating and comparing absolute distances. In some embodiments, the processor 45 may determine whether the second location 1312*a* is nearer to the target interface element 1302 than the first location 1310 using relative measurements.

In response to determining the second location 1312*a* is nearer to the target interface element 1302 than the first location 1310, at 1214, the processor 45 may control the ultrasonic actuator 19 to provide a pleasurable friction feedback effect. In some embodiments, the pleasurable friction feedback effect may be provided by simulating a low coefficient of friction between the player feature and the touchscreen surface 18. For example, the player feature may detect a smooth, silky, glue-like or felt-like texture on the touchscreen surface 18. That is, as the player feature may be getting closer to the target interface element 1302, the processor 45 may control the ultrasonic actuator 19 to provide less perceived resistance when the player feature approaches the target interface element 1302. Perceived or detected resistance may include a gritty or sandpaper-like texture. In contrast, less perceived or detected resistance may include a smooth, silky, glue-like or felt-like texture.

In some embodiments, the friction feedback effect may be on a progressive scale. That is, as the processor 45 determines that the player feature is gradually getting closer to the target interface element 1302, the processor 45 may control the ultrasonic actuator 19 to gradually adjust a standing wave frequency that is coupled to the touchscreen surface 18 such that the coefficient of friction between the player feature and the touchscreen gradually decreases.

Accordingly, as in the example illustrated with reference to FIGS. 13A and 13B, as the player feature contacts the touchscreen surface 18 at successively different locations, if the processor 45 controls the ultrasonic actuator 19 to adjust a standing wave frequency such that the coefficient of friction between the player feature and the touchscreen surface 18 decreases, the processor 45 may progressively provide signals to the player that the player feature is progressively moving towards the target interface element 1302. In some embodiments, the processor 45 may control the ultrasonic actuator 19 to adjust any other parameter such that a texture or friction feedback effect for a simulated surface changes. For example, the processor 45 may control a standing wave amplitude or any other standing wave parameter such that a texture or friction feedback effect for a simulated surface changes.

Figure 13A:
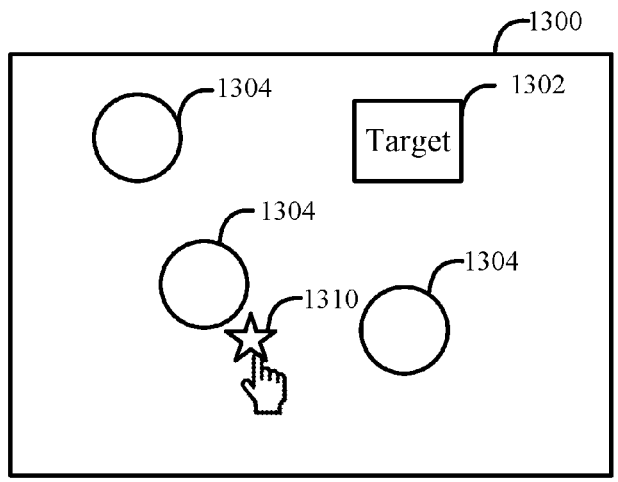
FIGS. 13A, 13B, 13C illustrate an example game interface when providing haptic feedback to guide a player towards a target interface element.
Figure 13B:
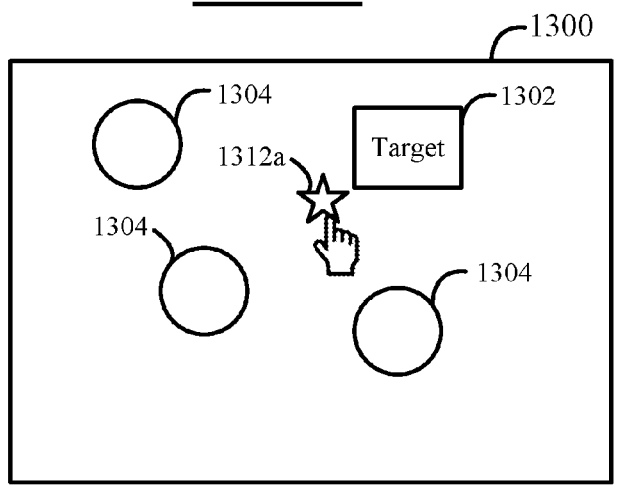
Figure 13C:
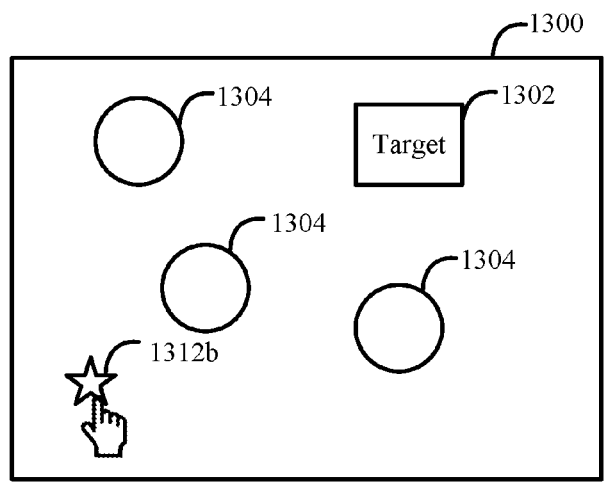

In another example, referring concurrently to FIGS. 13A and 13C, the processor 45 may detect that the outstretched player finger may be moving away from the target interface element 1302. Referring to FIG. 13C, at 1208, the processor 45 may detect the player feature contacting the touchscreen surface at a third location 1312*b*.

At 1210, the processor 45 may determine whether the third location 1312*b* is nearer to the target interface element 1302 than the first location 1310.

In response to determining the third location 1312*b* is not nearer to the target interface element than the first location 1310, at 1216, the processor 45 may control the ultrasonic actuator 19 to provide an undesirable friction feedback effect. In some embodiments, the undesirable friction feedback effect may be provided by simulating a high coefficient of friction between the player feature and the touchscreen surface 18. For example, the player feature may detect a gritty or sandpaper-like texture on the touchscreen surface 18.

In some embodiments, the friction feedback effect may be on a progressive scale. That is, as the processor 45 determines that the player feature is not getting closer to the target interface element 1302, the processor 45 may control the ultrasonic actuator 19 to gradually adjust a standing wave frequency that is coupled to the touchscreen surface 18 such that the simulated coefficient of friction between the player feature and the touchscreen surface 18 gradually increases.

Accordingly, as in the example illustrated with reference to FIGS. 13A and 13C, as the player feature contacts the touchscreen surface 18 at successively different locations, if the processor 45 controls the ultrasonic actuator 19 to adjust a standing wave frequency such that the coefficient of friction between the player feature and the touchscreen surface 18 increases, the processor 45 may progressively provide signals to the player that the player feature is progressively moving away from the target interface element 1302.

Accordingly, in addition to providing audio and visual prompts to guide a player, the processor 45 may guide a player using haptic feedback. By increasing or decreasing the perceived textured resistance, for example, on the touchscreen surface 18 detected by the player feature, the processor 45 may guide a player feature toward a target interface element 1302.

Identifying Textured Interface Elements

Figure 14:
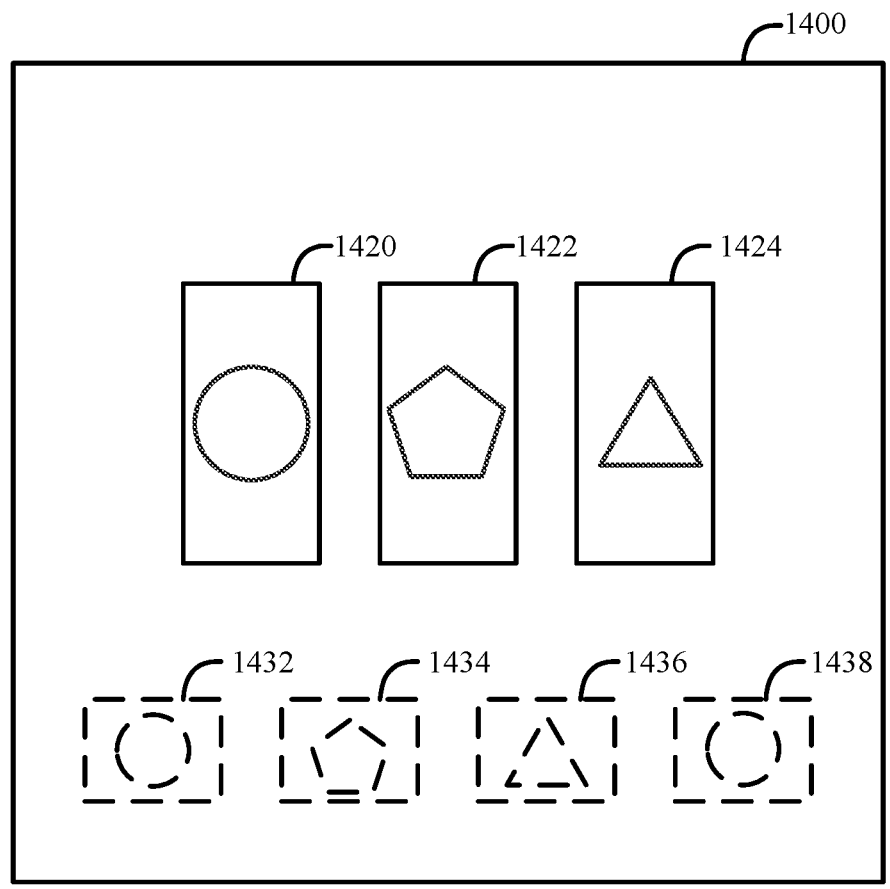
FIG. 14 illustrates an example game interface provided to a player of an EGM.

Reference is now made to FIG. 14 which illustrates a game interface 1400 on a display 12 of an EGM 10. The display 12 may be a touchscreen having a touchscreen surface 18. The EGM 10 may be of the type described above with reference to FIG. 1 or 5 or a variation of such an electronic display. For example, the processor 45 may provide the game interface 1400 to a display 12 and a player may view the game interface 1400 from the touchscreen surface 18.

When the game interface 1400 is displayed on the display (e.g., viewable from the touchscreen surface 18), the processor 45 may provide two or more selectable interface elements 1420, 1422, 1424, 1432, 1434, 1436, 1438. Each of the selectable interface elements may be associated with a touchscreen surface portion on the touchscreen surface 18. In some embodiments, each of the selectable interface elements 1420, 1422, 1424 may, for example, be visually distinguishable from each other.

In some embodiments, even though each of the selectable interface elements 1420, 1422, 1424 may be visually distinguishable from another of the selectable interface elements 1420, 1422, 1424, a player may be unable to visually determine which of the selectable interface elements 1420, 1422, 1424 may be associated with a desired outcome. For example, in some embodiments, the game may require that a player feature locate the selectable interface elements having the roughest or smoothest texture, but the visual appearance of the selectable interface elements 1420, 1422, 1424 may not provide any clues as to which of the selectable interface elements may have the roughest or smoothest texture. Accordingly, as in the example illustrated with reference to FIG. 14, the processor 45 may require that a player feature interact with the game using the provided simulated textures on the touchscreen surface 18.

In another embodiment, when the game interface 1400 is displayed on the display 12 (e.g., viewable from the touchscreen surface 18), the processor 45 may provide two or more selectable interface elements 1432, 1434, 1436, 1438 that may not be displayed on the display 12. That is, the game may require that the player feature find hidden prizes. Based on detected location of a player feature contacting the touchscreen surface 18, the processor 45 may control the ultrasonic actuator 19 for simulating different textures on the touchscreen surface 18. The processor 45 may not provide visual representations of selectable interface elements representing the simulated textures. The processor 45 may prompt the user to search for selectable interface elements 1432, 1434, 1436, 1438 based on textures simulated on the touchscreen surface 18.

In some embodiments, the processor 45 may track player gaming behaviour to ensure responsible game playing. For example, the processor 45 may determine whether one or more irresponsible gaming conditions are found to exist. The processor 45 may determine the presence of an irresponsible gaming condition based on historical data regarding the player's game play. For example, the processor 45 may monitor the duration of a gaming session and, if the duration exceeds a threshold, the processor 45 may determine that an irresponsible gaming condition exists. In some embodiments, the processor 45 may determine whether a player's loss during a game session exceeds a threshold and, if so, the processor 45 may determine that an irresponsible gaming condition exists. When one or more irresponsible gaming conditions are found to exist, the processor 45 may control the ultrasonic actuator 19 to provide a simulated texture detectable from the touchscreen surface 18 for discouraging or for annoying the player feature. For example, in a discouraging mode, the processor 45 may control the ultrasonic actuators 19 to provide an undesirable friction feedback effect on the touchscreen surface 18. The undesirable friction feedback effect may be provided by simulating a high coefficient of friction between the player feature and the touchscreen surface 18. That is, the player feature may detect a harsh, gritty or rough sandpaper-like texture. Alternatively, the player may detect a combination of gritty textures and varying texture frequency. Accordingly, as the processor 45 determines that a player may be engaging in potentially irresponsible gaming behaviour, the processor 45 may control the ultrasonic actuator 19 to provide haptic feedback indicating that the processor 45 may have identified irresponsible behaviour and that the player may consider alternative gaming behaviour.

In some embodiments, a friction feedback effect may be provided based on the outcome or history of gameplay on the electronic gaming machine 10. For example, the processor 45 may control the ultrasonic actuator 19 to provide a rewarding friction feedback effect in response to detecting a win. The rewarding positive feedback effect may have a pattern and/or intensity that are appealing or enthusiastic to a user. By way of example, short reoccurring textures may be provided to trigger feelings of excitement.

In some embodiments, the processor 45 may control the ultrasonic actuator 19 to provide a losing tactile feedback effect in response to determining that the output of the gameplay is a loss. For example, in response to detecting a loss, the processor 45 may control the ultrasonic actuators to provide a friction feedback effect that may be unenthusiastic. The losing friction feedback effect may be different than the rewarding friction feedback effect provided in response to a win. The processor 45 may control the ultrasonic actuators 19 to provide a friction feedback effect that may not be pleasurable to the player or user.

In some embodiments, the processor 45 may control the ultrasonic actuators 19 to provide a first friction feedback effect to indicate when an interface element may be enabled. Further, the processor 45 may control the ultrasonic actuators 19 to provide a second friction feedback effect to indicate when an interface element may be disabled. For example, a game interface may include a "Call Attendant" interface element. When a player contacts the "Call Attendant" interface element, the processor 45 may control the ultrasonic actuator 19 to provide the first friction feedback effect indicating that a request has been sent to casino staff. A player may, however, want to cancel the request and may subsequently contact the "Call Attendant" interface element again. In response, the processor 45 may control the ultrasonic actuator 19 to provide the second friction feedback effect indicating that the request has been cancelled.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, it will be obvious to those skilled in the art that changes and modifications may be made without departing from this invention in its broader aspects. The appended claims are to encompass within their scope all such changes and modifications.

What is claimed is:

1. An electronic gaming machine for providing a game to a player, the electronic gaming machine comprising:
   a touchscreen having a touchscreen surface;
   an ultrasonic actuator coupled to the touchscreen surface to vibrate the touchscreen surface; and
   a processor coupled to the touchscreen and the ultrasonic actuator, the processor configured to:
      identify a location of a player feature on the touchscreen surface; and
      control the ultrasonic actuator based on at least one of the identified location and a game state associated with the game to provide a friction feedback effect to the player;
      wherein controlling the ultrasonic actuator to provide the friction feedback effect includes the ultrasonic actuator emitting an ultrasonic field having a standing wave, the standing wave corresponding to the friction feedback effect detected by the player feature from the touchscreen surface.

2. The electronic gaming machine of claim 1, wherein controlling the ultrasonic actuator to provide friction feedback effect includes controlling the ultrasonic actuator to alter the friction feedback effect detected by the player feature from the touchscreen surface.

3. The electronic gaming machine of claim 1, wherein the processor is further configured to:
   determine whether the player feature has contacted at least one interface element displayed on the touchscreen surface based on the location of the player feature, and
   wherein controlling the ultrasonic actuator includes:
      in response to determining that the player feature has not contacted the at least one interface element, setting a friction feedback effect to simulate a higher coefficient of friction between the player feature and the touchscreen surface than that associated with the at least one interface element.

4. The electronic gaming machine of claim 1, wherein the processor is further configured to:
   determine whether the player feature has contacted an interface element displayed on the touchscreen surface based on the location of the player feature, the interface element being associated with first friction feedback information defining a first friction feedback effect, and
   wherein controlling the ultrasonic actuator includes:
      in response to determining the player feature has contacted the interface element, setting a first friction feedback effect based on the first friction feedback information, and
      wherein the game includes a second interface element that is associated with second friction feedback information defining a second friction feedback effect, the second friction feedback effect being different than the first friction feedback effect.

5. The electronic gaming machine of claim 1, wherein the processor is further configured to:
   determine a current friction feedback effect on the touchscreen surface; and
   determine whether the player feature has relocated from a first location to a second location, and
   wherein controlling the ultrasonic actuator includes:
      in response to determining the player feature has relocated from a first location to a second location, controlling the ultrasonic actuator to provide a cumulative friction feedback effect.

6. The electronic gaming machine of claim 1, wherein controlling the ultrasonic actuator comprises:
   providing a friction feedback effect on the touchscreen surface based on an outcome or history of gameplay on the electronic gaming machine.

7. The electronic gaming machine of claim 1, wherein the processor is further configured to:
   provide a target interface element, and
   wherein controlling the ultrasonic actuator includes:
      detecting the player feature contacting the touchscreen surface at a first location;
      controlling the ultrasonic actuator to provide a first friction feedback effect on the touchscreen surface;
      detecting the player feature contacting the touchscreen surface at a second location;
      determining whether the second location is nearer to the target interface element than the first location; and
      in response to determining the second location is nearer to the target interface element than the first location, controlling the ultrasonic actuator to provide a second friction feedback effect that is different from the first friction feedback effect.

8. The electronic gaming machine of claim 7, wherein the provided target interface element is not displayed on the touchscreen surface.

9. The electronic gaming machine of claim 7, wherein the first friction feedback effect is provided by causing the touchscreen surface to vibrate at a first ultrasonic frequency.

10. The electronic gaming machine of claim 9, wherein the processor is further configured to:
   in response to determining the second location is not nearer to the target interface element than the first location, control the ultrasonic actuator to provide a second friction feedback effect, wherein the second friction feedback effect is provided by causing the touchscreen surface to vibrate at a second ultrasonic frequency that is lower than the first ultrasonic frequency.

11. A method for providing a game to a player at an electronic gaming machine, the electronic gaming machine comprising a touchscreen having a touchscreen surface and an ultrasonic actuator coupled to the touchscreen surface to vibrate the touchscreen surface, the method comprising:
   identifying a location of a player feature on the touchscreen surface; and
   controlling the ultrasonic actuator based on at least one of the identified location and a game state associated with the game to provide a friction feedback effect to the player;
   wherein controlling the ultrasonic actuator to provide the friction feedback effect includes the ultrasonic actuator emitting an ultrasonic field having a standing wave, the standing wave corresponding to the friction feedback effect detected by the player feature from the touchscreen surface.

12. The method of claim 11, wherein controlling the ultrasonic actuator to provide a friction feedback effect includes controlling the ultrasonic actuator to alter the friction feedback effect detected by the player feature from the touchscreen surface.

13. The method of claim 11, the method further comprising:
   determining whether the player feature has contacted at least one interface element displayed on the touchscreen surface based on the location of the player feature, and wherein controlling the ultrasonic actuator includes:
   in response to determining that the player feature has not contacted the at least one interface element, setting a friction feedback effect to simulate a higher coefficient of
   friction between the player feature and the touchscreen surface than that associated with the at least one interface element.

14. The method of claim 11, the method further comprising:
   determining whether the player feature has contacted an interface element displayed on the touchscreen surface based on the location of the player feature, the interface element being associated with first friction feedback information defining a first
   friction feedback effect, and
   wherein controlling the ultrasonic actuator includes:
   in response to determining the player feature has contacted the interface element, setting a first friction feedback effect based on the first friction feedback information, and
   wherein the game includes a second interface element that is associated with second friction feedback information defining a second friction feedback effect, the second friction feedback effect being different than the first friction feedback effect.

15. The method of claim 11, the method further comprising:
   determining a current friction feedback effect on the touchscreen surface; and
   determining whether the player feature has relocated from a first location to a second location, and
   wherein controlling the ultrasonic actuator includes:
   in response to determining the player feature has relocated from a first location to a second location, controlling the ultrasonic actuator to provide a cumulative friction feedback effect.

16. The method of claim 11, wherein controlling the ultrasonic actuator comprises providing a friction feedback effect on the touchscreen surface based on an outcome or history of gameplay on the electronic gaming machine.

17. The method of claim 11, the method further comprising:
providing a target interface element, and
wherein controlling the ultrasonic actuator includes:
detecting the player feature contacting the touchscreen surface at a first location;
controlling the ultrasonic actuator to provide a first friction feedback effect on the touchscreen surface;
detecting the player contacting the touchscreen surface at a second location;
determining whether the second location is nearer to the target interface element than the first location; and
in response to determining the second location is nearer to the target interface element than the first location, controlling the ultrasonic actuator to provide a second friction feedback effect that is different from the first friction feedback effect.

18. The method of claim 17, wherein the provided target interface element is not displayed on the touchscreen surface.

19. The method of claim 17, wherein the second friction feedback effect is provided by causing the touchscreen surface to vibrate at a second ultrasonic frequency that is higher than a first ultrasonic frequency of the first friction feedback effect.

20. The method of claim 17, the method further comprising:
in response to determining the second location is not nearer to the target interface element than the first location, controlling the ultrasonic actuator to provide a second friction feedback effect, wherein the second friction feedback effect is provided by causing the touchscreen surface to vibrate at a second ultrasonic frequency that is lower than a first ultrasonic frequency of the first friction feedback effect to provide simulated resistance to the player feature.

* * * * *